United States Patent
Yoo et al.

(10) Patent No.: US 11,191,252 B2
(45) Date of Patent: Dec. 7, 2021

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 16/569,841

(22) Filed: Sep. 13, 2019

(65) Prior Publication Data
US 2020/0085006 A1     Mar. 19, 2020

Related U.S. Application Data

(60) Provisional application No. 62/733,393, filed on Sep. 19, 2018.

(30) Foreign Application Priority Data

| Oct. 16, 2018 | (KR) | 10-2018-0122993 |
| Nov. 1, 2018 | (KR) | 10-2018-0133092 |
| May 24, 2019 | (KR) | 10-2019-0060920 |

(51) Int. Cl.
*A01K 7/02* (2006.01)
*B67D 1/08* (2006.01)
*B67D 1/00* (2006.01)

(52) U.S. Cl.
CPC .............. *A01K 7/027* (2013.01); *A01K 7/025* (2013.01); *B67D 1/0004* (2013.01);
(Continued)

(58) Field of Classification Search
CPC ...... A01K 7/027; A01K 7/025; B67D 1/0888; B67D 1/0871; B67D 1/0004; B67D 1/0869
See application file for complete search history.

(56) References Cited

U.S. PATENT DOCUMENTS 3,303,824 A    2/1967   Anderson
3,765,614 A    10/1973   Bartl et al.
(Continued)

FOREIGN PATENT DOCUMENTS

CA     2082083     5/1994
CN     2351955     12/1999
(Continued)

OTHER PUBLICATIONS

United States Office Action dated Mar. 30, 2021 issued in co-pending related U.S. Appl. No. 16/571,090.
(Continued)

*Primary Examiner* — Donnell A Long
(74) *Attorney, Agent, or Firm* — Ked & Associates LLP

(57) ABSTRACT

A liquid dispenser may include a container or tank having an upper opening and in which water is stored, a pump provided in the container, a water supply pipe through which water discharged from the pump is transferred, a water supply plate having an upper surface over which water flows, a container support or base provided below the container, and a thermoelectric element provided in the container support to cool the bottom plate of the container.

19 Claims, 13 Drawing Sheets

(52) U.S. Cl.
CPC ......... *B67D 1/0869* (2013.01); *B67D 1/0871* (2013.01); *B67D 1/0888* (2013.01)

(56) References Cited

U.S. PATENT DOCUMENTS

| | | | |
|---|---|---|---|
| 4,100,885 A | 7/1978 | Kapplinger | |
| 4,286,546 A | 9/1981 | Moore | |
| 4,561,384 A | 12/1985 | Liff | |
| 4,640,226 A | 2/1987 | Liff | |
| 4,932,561 A * | 6/1990 | Boxall | B67D 1/04 137/487.5 |
| 5,105,771 A | 4/1992 | Schafer | |
| 5,140,134 A * | 8/1992 | Reusche | A01K 5/0114 119/73 |
| 5,174,245 A | 12/1992 | Bishop | |
| 5,345,063 A | 9/1994 | Reusche et al. | |
| 5,799,609 A | 9/1998 | Burns et al. | |
| 5,884,582 A | 3/1999 | Duckworth | |
| 6,230,653 B1 | 5/2001 | Tobin | |
| 6,622,657 B2 | 9/2003 | Northrop et al. | |
| 6,848,392 B1 | 2/2005 | Kreutzer, Jr. | |
| 7,089,881 B2 | 8/2006 | Plante | |
| 7,270,082 B2 | 9/2007 | Plante | |
| 7,549,395 B2 | 6/2009 | Stenberg | |
| 7,743,698 B2 | 6/2010 | Muir et al. | |
| 7,823,538 B1 | 11/2010 | Merager | |
| 8,117,991 B1 | 2/2012 | Civitillo | |
| 8,210,447 B2 | 7/2012 | Cohen | |
| 8,770,147 B2 | 7/2014 | Rowe | |
| 9,497,930 B2 | 11/2016 | Lipscomb et al. | |
| 10,165,753 B1 | 1/2019 | Huang | |
| 2003/0140864 A1 | 7/2003 | Wenstrand | |
| 2003/0213437 A1 | 11/2003 | Norris | |
| 2005/0166853 A1 | 8/2005 | Plante | |
| 2006/0174838 A1 | 8/2006 | Plante | |
| 2006/0231040 A1 | 10/2006 | Bast et al. | |
| 2007/0045159 A1 | 3/2007 | Lee | |
| 2007/0199512 A1 | 8/2007 | Ellis | |
| 2007/0227456 A1 * | 10/2007 | Borey | A01K 5/0114 119/61.52 |
| 2008/0078330 A1 | 4/2008 | McCallum et al. | |
| 2008/0190374 A1 | 8/2008 | Farris | |
| 2010/0095897 A1 | 4/2010 | Rowe | |
| 2010/0300366 A1 | 12/2010 | Lipscomb et al. | |
| 2011/0067638 A1 | 3/2011 | Lipscomb et al. | |
| 2011/0102945 A1 | 5/2011 | Isono et al. | |
| 2012/0017839 A1 | 1/2012 | Veness et al. | |
| 2012/0111280 A1 | 5/2012 | Shin et al. | |
| 2012/0216751 A1 | 8/2012 | Rowe | |
| 2013/0092090 A1 | 4/2013 | McCallum | |
| 2013/0228132 A1 | 9/2013 | Lipscomb et al. | |
| 2014/0053781 A1 | 2/2014 | Lewis | |
| 2014/0076242 A1 | 3/2014 | Ho | |
| 2014/0251223 A1 | 9/2014 | Rowe et al. | |
| 2014/0353335 A1 * | 12/2014 | Van Diepen | B65D 47/2031 222/52 |
| 2015/0189862 A1 | 7/2015 | Lipscomb | |
| 2015/0313180 A1 | 11/2015 | Lipscomb et al. | |
| 2015/0353335 A1 * | 12/2015 | Breault | B67D 1/0021 222/129.1 |
| 2016/0000037 A1 | 1/2016 | Lipscomb et al. | |
| 2016/0118179 A1 | 4/2016 | Park et al. | |
| 2016/0159633 A1 * | 6/2016 | Diffenderfer | B67D 1/0877 222/23 |
| 2016/0286757 A1 | 10/2016 | Armstrong | |
| 2017/0245465 A1 | 8/2017 | Oates et al. | |
| 2018/0160648 A1 | 6/2018 | Goh | |
| 2019/0075755 A1 | 3/2019 | Imaizumi et al. | |
| 2019/0227580 A1 | 7/2019 | von der Assen et al. | |
| 2019/0239491 A1 | 8/2019 | Yu et al. | |
| 2020/0337266 A1 * | 10/2020 | Yu | A01K 7/025 |

FOREIGN PATENT DOCUMENTS

| | | | |
|---|---|---|---|
| CN | 1701206 | 11/2005 | |
| CN | 2776044 | 5/2006 | |
| CN | 201422313 | 3/2010 | |
| CN | 201541568 | 8/2010 | |
| CN | 101816289 | 9/2010 | |
| CN | 101841191 | 9/2010 | |
| CN | 102480927 | 5/2012 | |
| CN | 202722224 | 2/2013 | |
| CN | 202873523 | 4/2013 | |
| CN | 203136752 | 8/2013 | |
| CN | 203618522 | 6/2014 | |
| CN | 103917147 | 7/2014 | |
| CN | 103931515 | 7/2014 | |
| CN | 204707695 | 10/2015 | |
| CN | 204722018 | 10/2015 | |
| CN | 105265331 | 1/2016 | |
| CN | 205005702 | 2/2016 | |
| CN | 105792644 | 7/2016 | |
| CN | 205431490 | 8/2016 | |
| CN | 205682161 | 11/2016 | |
| CN | 106172064 | 12/2016 | |
| CN | 106212310 | 12/2016 | |
| CN | 205830734 | 12/2016 | |
| CN | 106332801 | 1/2017 | |
| CN | 205884322 | 1/2017 | |
| CN | 206227319 | 6/2017 | |
| CN | 106962218 | 7/2017 | |
| CN | 206314381 | 7/2017 | |
| CN | 107041318 | 8/2017 | |
| CN | 107124043 | 9/2017 | |
| CN | 107509653 | 12/2017 | |
| CN | 206699096 | 12/2017 | |
| CN | 206760412 | 12/2017 | |
| CN | 206760441 | 12/2017 | |
| CN | 107568092 | 1/2018 | |
| CN | 206851699 | 1/2018 | |
| CN | 206949206 | 2/2018 | |
| CN | 107821202 | 3/2018 | |
| CN | 107897027 | 4/2018 | |
| CN | 107897027 A * | 4/2018 | ............... A01K 7/02 |
| CN | 207411173 | 5/2018 | |
| CN | 207443927 | 6/2018 | |
| CN | 207519400 | 6/2018 | |
| CN | 108271728 | 7/2018 | |
| CN | 108353810 | 8/2018 | |
| CN | 108377928 | 8/2018 | |
| CN | 108464253 | 8/2018 | |
| CN | 207803161 | 9/2018 | |
| CN | 207870035 | 9/2018 | |
| CN | 109997713 | 7/2019 | |
| DE | 20 2016 107 252 | 3/2018 | |
| EP | 0 894 430 | 2/1999 | |
| EP | 1 566 099 | 8/2005 | |
| EP | 3 315 022 | 5/2018 | |
| EP | 3 520 607 | 8/2019 | |
| GB | 2 458 173 | 9/2009 | |
| JP | H07-269800 | 10/1995 | |
| JP | 2012-188163 | 10/2012 | |
| JP | 2017-148018 | 8/2017 | |
| JP | 2018-057340 | 4/2018 | |
| KR | 10-2014-0042949 | 4/2014 | |
| KR | 20-0475039 | 11/2014 | |
| KR | 10-2017-0003154 | 1/2017 | |
| KR | 10-2017-0017718 | 2/2017 | |
| KR | 10-1825334 | 2/2018 | |
| RU | 2650560 | 4/2018 | |
| TW | 201641007 | 12/2016 | |
| TW | I 574614 | 3/2017 | |
| WO | WO 2011/035320 | 3/2011 | |
| WO | WO 2017/185053 | 10/2017 | |

OTHER PUBLICATIONS

European Search Report dated Feb. 27, 2020 issued in Application No. 19198292.5.

(56) References Cited

OTHER PUBLICATIONS

European Search Report dated Feb. 27, 2020 issued in Application No. 19198298.2.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
European Search Report dated Apr. 9, 2020 issued in EP Application No. 19198174.5.
United States Office Action dated Jun. 2, 2020 issued in co-pending related U.S. Appl. No. 16/574,259.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
European Search Report dated Feb. 3, 2020 issued in EP Application No. 19198170.3.
United States Office Action dated May 11, 2021 issued in co-pending related U.S. Appl. No. 16/571,093.
United States Office Action dated Apr. 27, 2021 issued in co-pending related U.S. Appl. No. 16/574,418.
Chinese Office Action dated May 17, 2021 issued in CN Application No. 201910889361.9.
Chinese Office Action dated Mar. 30, 2021 issued in CN Application No. 201910886714.X.
European Search Report dated Feb. 24, 2020 issued in EP Application No. 19198289.1.
Chinese Office Action dated Mar. 31, 2021 issued in CN Application No. 201910886533.7.
Chinese Office Action dated Apr. 1, 2021 issued in CN Application No. 201910886305.X.
Chinese Office Action dated Apr. 9, 2021 issued in CN Application No. 201910886526.7.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,418, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,090, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,841, filed Sep. 13, 2019.
U.S. Appl. No. 16/569,908, filed Sep. 13, 2019.
Chinese Office Action dated May 10, 2021 issued in CN Application No. 201910888718.1.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
Chinese Office Action dated May 21, 2021 issued in CN Application No. 201910888661.5.
United States Office Action dated Oct. 5, 2021 issued in co-pending related U.S. Appl. No. 16/571,074.

\* cited by examiner

LIQUID DISPENSER FOR ANIMALS

CROSS-REFERENCE TO RELATED APPLICATION(S)

This application claims priority under 35 U.S.C. § 119 to U.S. Provisional Application No, 62/733,393 filed on Sep. 19, 2018 and Korean Application Nos. 10-2019-0060920 filed on May 24, 2019, 10-2018-0122993 filed on Oct. 16, 2018, and 10-2018-0133092 filed on Nov. 1, 2018, whose entire disclosure(s) are hereby incorporated by reference.

BACKGROUND

1. Field

A liquid dispenser to supply liquid to an animal, e.g., a pet, is disclosed herein.

2. Background

In recent years, the population of people raising a pet has increased, in addition attachment and interest in pets. Like most animals, pets must drink water to survive and maintain a biorhythm. Since pets are often left alone and since communication with their owners is difficult, the demand for pet water dispensers or water supply devices has increased.

European Patent No. 3315022 A1 and U.S. Publication No. 2014/0053781 (hereinafter referred to as "related art") disclose drinking bowls for pets. However, such drinking bowls have various disadvantages, which the present disclosure solves.

The above references are incorporated by reference herein where appropriate for appropriate teachings of additional or alternative details, features and/or technical background.

DETAILED DESCRIPTION OF THE INVENTION

Figure 1:
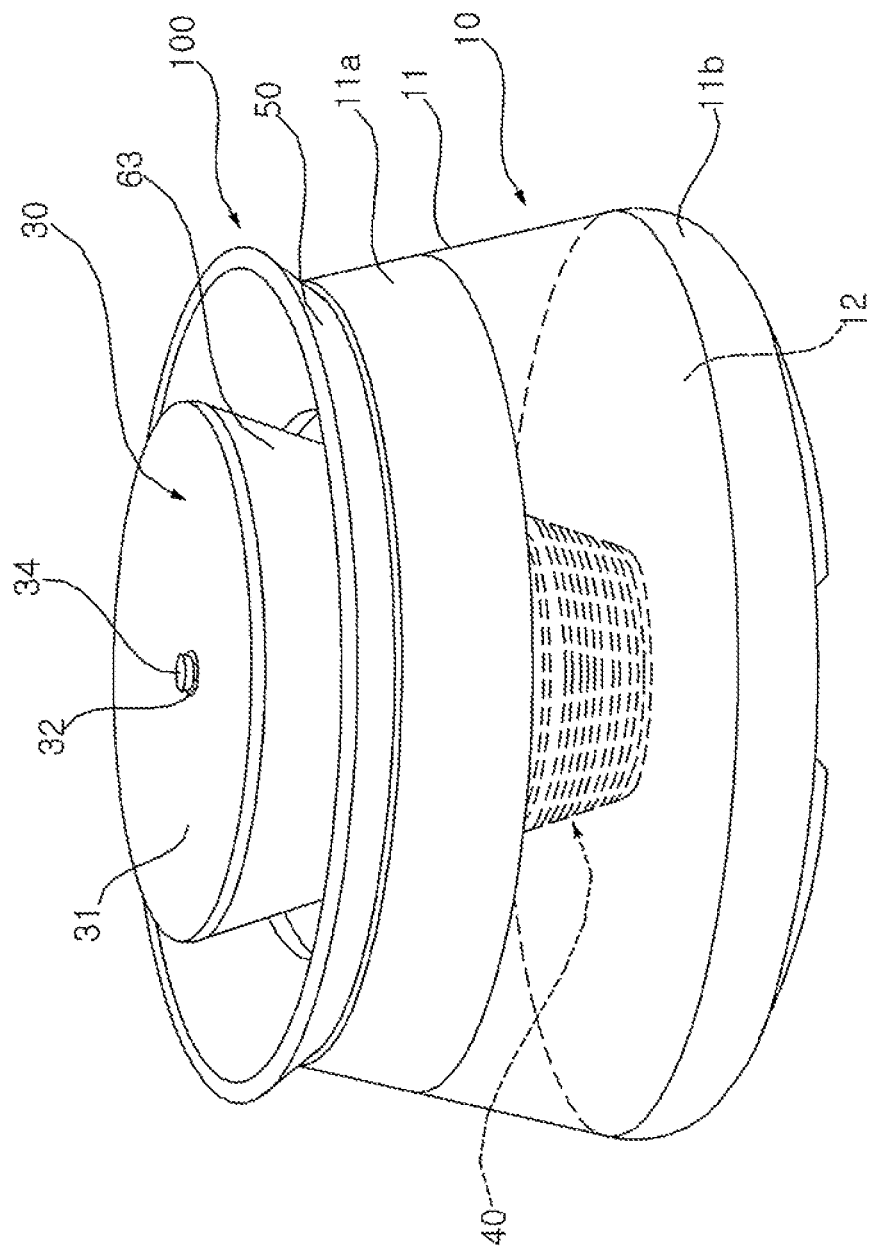
FIG. 1 is a perspective view showing a pet water dispenser according to an embodiment.
Figure 2:
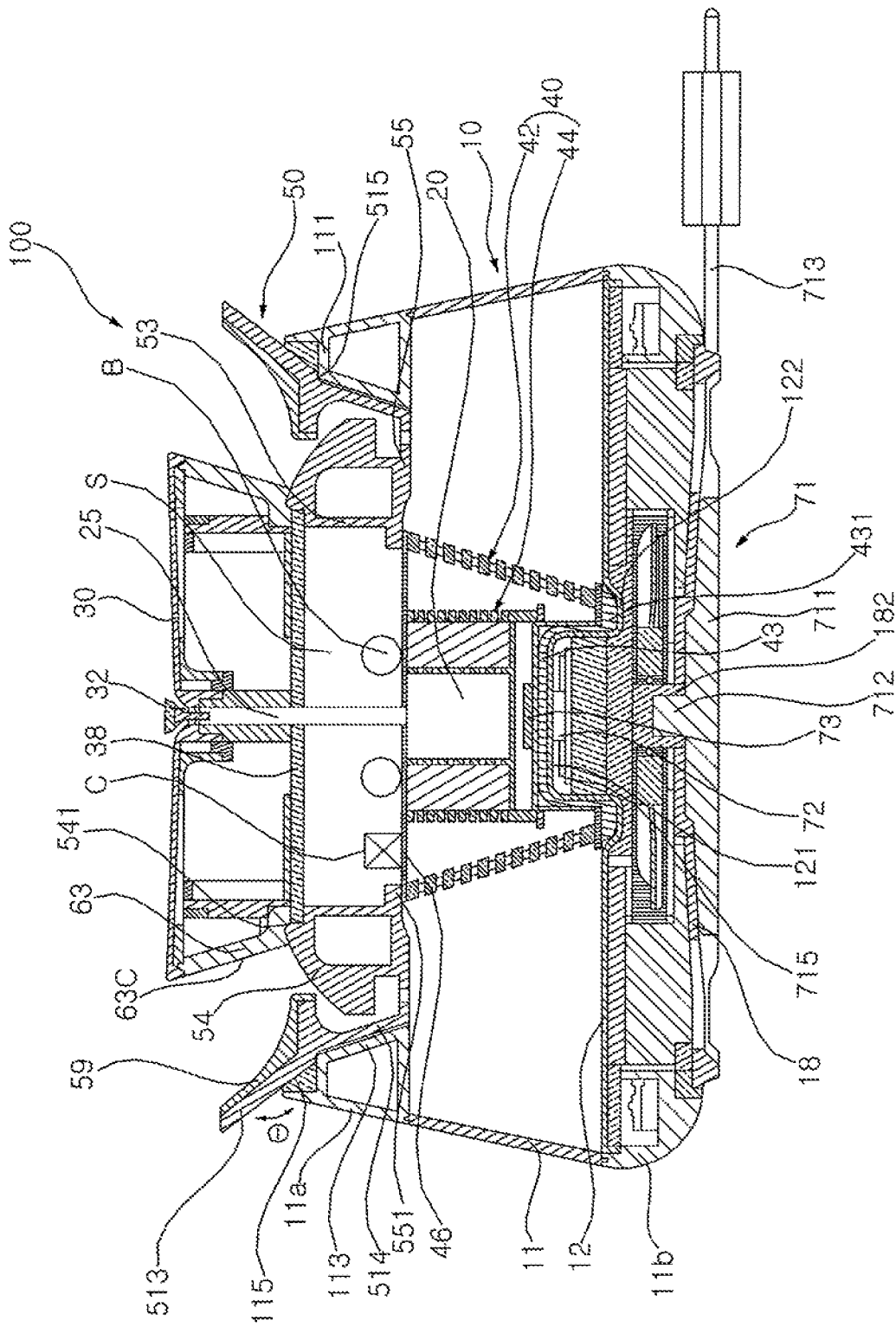
FIG. 2 is a side sectional view of the pet water dispenser shown in FIG. 1.
Figure 3:
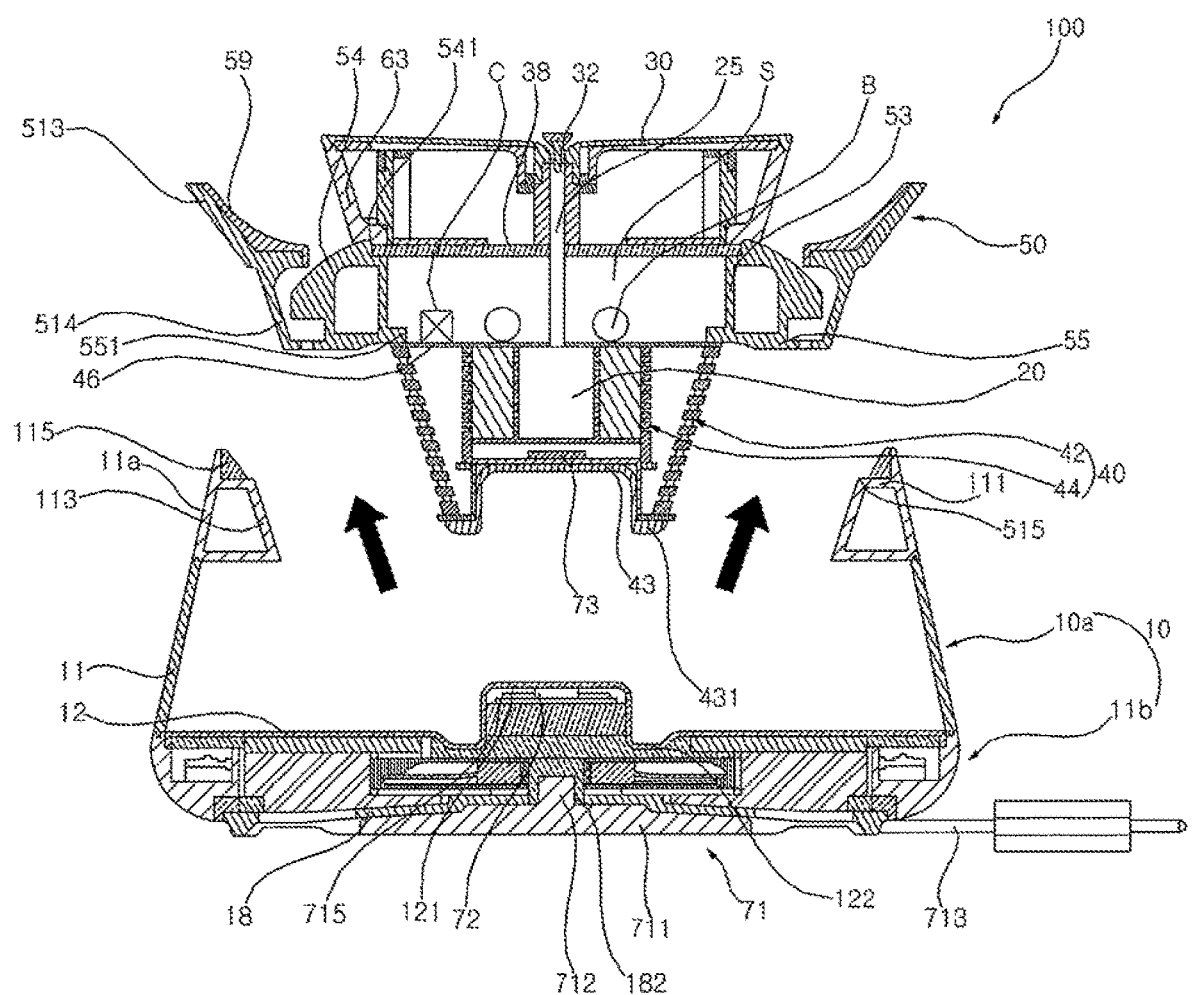
FIG. 3 is a view showing a state in which an inner assembly shown in FIG. 2 is separated from a water tank.

Referring to FIGS. 1 to 3, a pet water dispenser according to an embodiment may include a water storage chamber or water tank 10 having an opened upper side or an open top and an inner assembly 100 covering the open top of the liquid tank 10. The inner assembly 100 may have an upper surface or plate body 31 of a water supply plate or upper plate 30 and a support 63 to project the water supply plate 30 upward. The support 63 may serve as a light diffuser and also may be referred to as a light guide or light guide plate.

Figure 8:
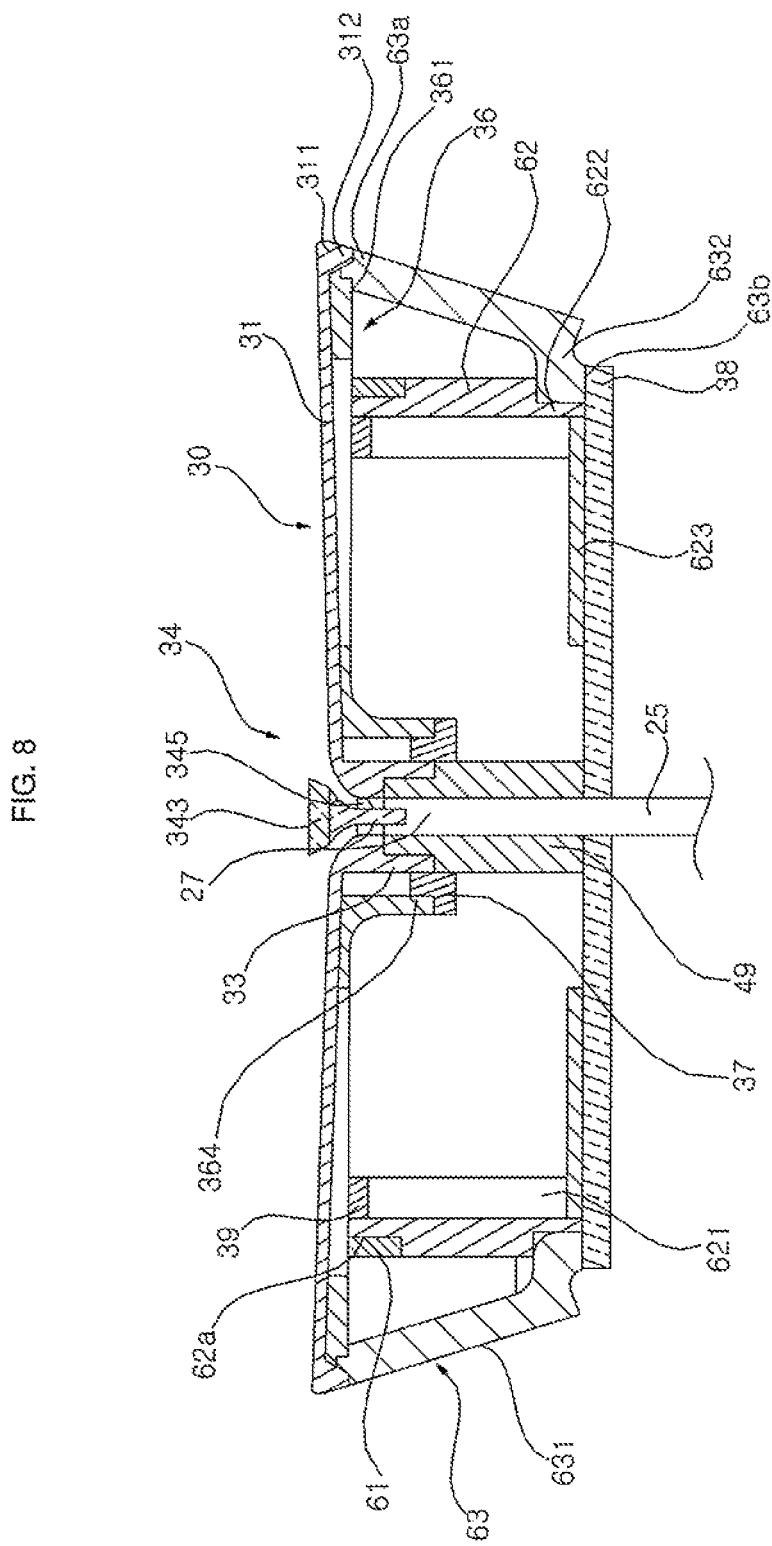
FIG. 8 is a side sectional view of the state where the components shown in FIG. 7 and an illumination assembly are combined.

Referring to FIG. 8, an upper end of an outer circumferential surface or outer surface 631 of the support 63 may be positioned at an edge 311 of the upper surface 31. The outer surface 631 of the support 63 may be formed as an inclined surface that inclines inward toward a center of the water tank 10 from an upper end 63a of the support 63 toward a lower end 63b of the support 63 (FIG. 8). Additional details of the support 63 and an illumination assembly 60 will be described later with reference to FIG. 8.

Referring back to FIGS. 1-3, an upper portion of the inner assembly 100 may protrude above the water tank 10, and a lower portion of the inner assembly 100 may be inserted into the water tank 10. A pump 20 to supply water in the water tank 10 to the upper surface 31 may be provided in the lower portion of the inner assembly 100.

Water pumped to the upper surface 31 may fall or cascade off the edge 311 of the upper surface 31 if a pumping capacity or rate of the pump 20 is high. If the pumping capacity of the pump 20 is low, water may flow downward along the inclined surface 63C of the support 63. The pet may drink water flowing over the upper surface 31. In addition, the pet may drink water falling off the edge 311 of the upper surface 31.

The pet water dispenser may be formed of the water tank 10 and the inner assembly 100, which may be insertably coupled to each other. When a user lifts the inner assembly 100 by holding a water guide or a water receiver 50, which may be the lowermost part of the inner assembly 100, the inner assembly 100 may be separated from the water tank 10. The user may easily exchange or replace the water stored in the water tank 10 or easily wash the water tank 10 after detaching the inner assembly 100 from the water tank 10.

The inner assembly 100 may include the pump 20, a water supply pipe 25, the water supply plate 30, and the water guide 50, which may be integrally combined to form a single inner assembly 100. The pump 20 may be installed or located in a center of the water tank 10 when the inner assembly 100 is coupled to the water tank 10, The water supply pipe 25 may transfer the water discharged from the pump 20 to the water supply plate 30. The water supply pipe 25 may be arranged in the vertical direction of the inner assembly 100.

The water supply plate 30 may be provided above a central portion of the water tank 10. The water supply plate 30 may have the upper surface 31 over which the water supplied from the water supply pipe 25 flows. The upper surface 31 of the water supply plate 30 may form the upper surface of the inner assembly 100.

A water supply hole 32 to supply water from the water supply pipe 25 to the upper surface 31 may be formed at a center of the water supply plate 30. The water supply hole 32 may communicate with an upper end or outlet 27 of the water supply pipe 25.

Water that has been moved to the upper surface 31 through the water supply hole 32 may flow down to the water guide 50. After flowing over the edge 311 of the upper surface 31, water may either flow down the inclined surface 63C of the support 63 or may fall directly down to the water guide 50 without contacting the inclined surface 63C.

The edge 311 may be formed as a convex surface curved toward to an outside of the water supply plate 30. Therefore, water that has flowed on the upper surface 31 may easily flow down on the inclined surface 631 of the support 63.

Alternatively or in addition thereto, the water guide 50 may at least partially cover the opened top of the water tank 10. The water guide 50 may be provided below the water supply plate 30 to receive water from the water supply plate 30 or the support 63 and guide the received water back into the water tank 10. Water stored in the water tank 10 may be pumped to the upper surface 31 of the water supply plate 30 via the pump 20. The water supplied to the upper surface 31 may be returned to the water tank 10 via the water guide 50.

The inner assembly 100 may further include a filter or filter assembly 40 to filter the water stored in the water tank 10. The pump 20, the water supply pipe 25, the water supply plate 30, the water guide 50, and the filter assembly 40 may be combined to form a single inner assembly 100. If the inner assembly 100 further comprises a filter assembly 40, the pump 20 may pump the filtered filtrate or water of the filter assembly 40.

The filter assembly 40 may include a first filter 42 and a second filter 44 provided within the first filter 42. In addition, the inner assembly 100 may further include at least one UV (Ultraviolet Ray) filter or light 47, 48, and/or 49 to sterilize water provided in the filter assembly 40 and/or to surround the water supply pipe 25. See FIGS. 6 and 7. When the inner assembly 100 further comprises at least one UV filter 47, 48, or 49, the pump 20, the water supply pipe 25, the water supply plate 30, the water guide 50, the filter assembly 40, and the at least one UV filter 47, 48 or 49 may form a single inner assembly 100.

The UV filter 47, 48, and/or 49 may comprise a UV LED (Ultraviolet Light-Emitting Diode) and may emit UV radiation. The UV filter 47 and/or 48 may sterilize water stored in the water tank 10, and the UV filter 49 may sterilize the water discharged from the water supply pipe 25.

The water tank 10 may include a container 10a having the opened top of the water tank 10 and storing water therein, and a container support 11b provided below the container 10a. The container support 11b may provide a sealed or dry space separate from the container 10a in which electronic devices (e.g., a proximity sensor 87 or a thermoelectric element 81) may be installed. A bottom plate 12 may separate the container 10a from the container support 11b.

The container 10a may include tubular walls 11 and 11a provided above the bottom plate 12. Water may be stored in an inner space formed by the walls 11 and 11a and the bottom plate 12. The walls 11 and 11a may be formed in a cylindrical or truncated cone shape having a diameter that recedes toward the top of the water tank 10.

The wall 11 may be a main or middle wall, and the wall 11a may be an upper wall positioned on an upper end of the main wall 11. The main wall 11 may be formed of a transparent material (e.g., glass or plastic), and the upper wall 11a may be formed of an opaque material (e.g., stainless steel or pigmented plastic). The main wall 11 may define a portion of the water tank 10 where water is substantially stored. The user may visually check a water level and possible contamination level via the transparent main wall 11.

An upper end of the container support 11b may be positioned below the main wall 11. The container support 11b may be curved such that a lower end of the container support 11b is closer to a center of the water tank 10 than the upper end of the container support 11b. An outer peripheral surface 116 (FIG. 4) of the container support 11b may therefore be formed to have an outward or convex curvature.

The container support 11b may be formed of an opaque material. The main wall 11, the upper wall 11a, and the container support 11b may be formed of different materials, or alternatively may all be formed of the same material. As an example, the upper wall 11a and the container support 11b may be formed of stainless steel or plastic, and the main wall 11 may be formed of glass or plastic.

The main wall 11 may be provided on an upper side of the bottom plate 12. The container support 11b may be provided on a lower side of the bottom plate 12. The main wall 11 may have protrusions at upper and lower ends to couple to upper wall 11a and the container support 11b, and the container support 11b may have a groove or recess in which the bottom plate 12 may be inserted. Alternatively, the protrusion at the lower end of the main wall 11 may be inserted into a groove formed in the bottom plate 12. The upper and lower sides of the main wall 11 may form a side edge of the water tank 10. The bottom plate 12 may be cover an open bottom of the main wall 11.

A lower portion of the water guide 50 may be inserted into the water tank 10, and an upper portion of the water guide 50 may protrude outward from the water tank 10. An outer surface of the water guide 50 may be formed with an outer inclined surface 514 supported by an inner inclined surface 113. The outer inclined surface 514 may be inclined to protrude outward from a top end of the upper wall 11a. Details of a coupling between the water guide 50 and the upper wall 11a of the water tank 10 will be described later with reference to FIG. 4.

The pump 20 and the filter assembly 40 may be provided below the water guide 50 and inserted into the water tank 10. The filter assembly 40 may be connected to a lower end or extension 551 of an inner guide wall 53 (FIG. 10) of the water guide 50.

The inner assembly 100 may further include a partition plate 38. The partition plate 38 may be spaced apart from and provided below the water supply plate 30. The water supply pipe 25 may penetrate through the partition plate 38. The partition plate 38 may be inserted into a groove 541 formed on an upper side or surface of the inner guide wall 53 of the water guide 50 to cover an opened upper side of the inner guide wall 53 and seal off a space or a chamber S in which electronic devices such as a control module or controller C and an auxiliary battery B may be provided. Details of the sealed space S will be described later.

The water supply plate 30 may be provided above the water guide 50. The support 63 may be provided below the water supply plate 30 to extend between the water supply plate 30 and the water guide 50. The support 63 may also be referred to as a plate support. The lower end 63b (FIG. 8) of the support 63 may be inserted in the partition plate 38 and/or provided on the water guide 50. The inclined surface 63C of the support 63 may form a part of an outer surface of the inner assembly 100.

The support 63 may connect the water supply plate 30 and the water guide 50, and may also connect the partition plate 38 and the water supply plate 30. The water supply plate 30 and the partition plate 38 may each be coupled to the support 63. The support 63 may support the water supply plate 30 above the water tank 10.

The support 63 may be formed in a cylindrical or truncated cone shape. A light device 61 may be provided inside the support 63, and the support 63 may be formed with a light transmission material to emit the light generated by the light device 61. See FIG. 8.

The support 63 may be formed to have a diameter that increases from the lower end 63b to the upper end 63a. An upper end of the inclined surface 631 (FIG. 8) of the support 63 may be positioned below the edge 311 of the upper surface 31 of the water supply plate 30. The support 63 may form a hollow truncated cone such that top and bottom sides may be opened. The water supply plate 30 may cover or close the opened top side of the support 63 and the partition plate 38 may cover or close the open bottom side of the support 63. The water supply plate 30 and the support 63 may be provided above the inner guide wall 53 of the water guide 50.

The pump 20 may pump the water stored in the water tank 10 to the water supply plate 30. The pump 20 may be spaced apart from the bottom plate 12 of the water tank 10. The water supplied from the water supply pipe 25 flows to the upper surface 31 via the water supply hole 32 and may flow over the edge 311 of the water supply plate 30. The water guide 50 may be provided between the water tank 10 and the water supply plate 30. The filter assembly 40 may be installed inside a center of the water tank 10 when the inner assembly 100 is coupled to the water tank 10. The filter assembly 40 may filter foreign substances contained in the water before the water stored in the water tank 10 flows into the pump 20.

The pet water dispenser may further include a power supply device or assembly, an illumination assembly 60, a water level sensor 86, a water temperature sensor 85, a proximity sensor 87, a contamination level sensor 89, and a water temperature maintenance device or assembly to be described later with reference to FIG. 11.

Figure 4:
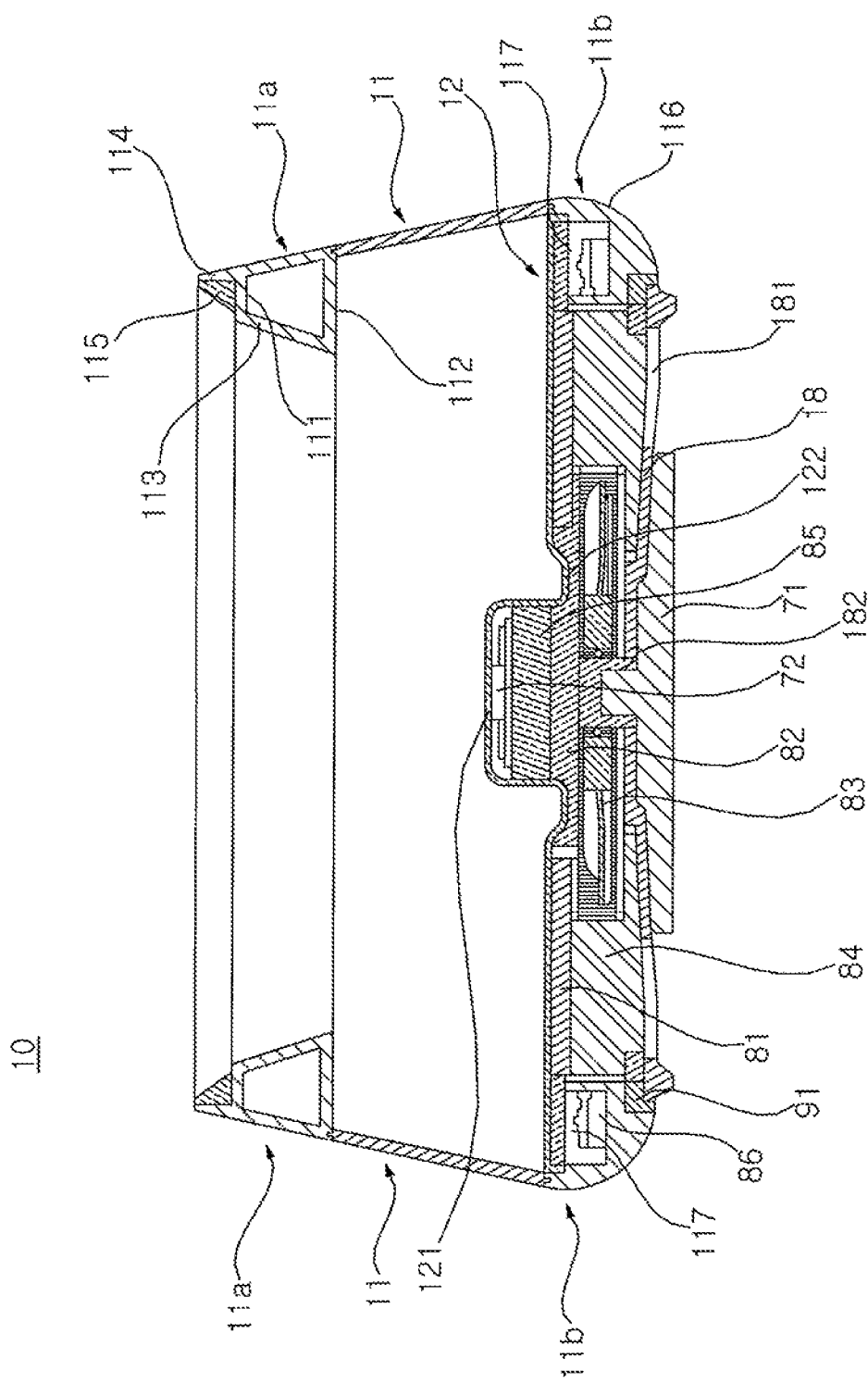
FIG. 4 is a side sectional view showing the water tank shown in FIG. 2.

Referring to FIGS. 1, 2, and 4, the container 10a may be formed in a cylindrical or truncated cone shape having a smaller diameter toward an upper side. However, the shape of the container 10a and the water tank 10 is not limited thereto and may be formed in other shapes. In the case where the container 10a is formed into a truncated cone shape whose diameter diminishes upward as described above, even if a considerable external impact is applied to the water tank 10, the water tank 10 may be stably positioned and not overturned.

The upper wall 11a may extend upward from the main wall 11. First and second protruding plates 111 and 112 may be formed on an inner surface of the upper wall 11a to protrude toward the center of the water tank 10. An inner inclined surface or inner tank wall 113 may extend between the first and second protruding plates 111 and 112. The inner tank wall 113 may be inclined inward from an upper end to a lower end.

The first and second protruding plates 111 and 112 may protrude horizontally toward a center of the water tank 10 from the inner side or surface of the upper wall 11a, and may be spaced apart from each other in a vertical direction. The first protruding plate 111 may be provided on above the second protruding plate 112. Lengths and positions of the first and second protruding plates 111 and 112 may be configured to set an inclination of the inner tank wall 113, which may be configured to support the lower inclined surface 514 of the water guide 50.

Therefore, a space or void may be formed within the first and second protruding plates 111 and 112 and the inner tank wall 113 so that a weight of the water tank 10 may be reduced. When the upper wall 11a is formed of an expensive material that enhances aestheticism, the voids formed inside the first and second protruding walls 111 and 112 and the inner tank wall 113 may reduce an amount of material required to form the upper wall 11a, thereby reducing the cost of the upper wall 11a.

The second protruding plate 112 may protrude further inward than the first protruding plate 111 and may therefore have a length longer than a length of the first protruding plate 111. The inner tank wall 113 may connect to inner sides or ends of the first protruding plate 111 and the second protruding plate 112.

The upper wall 11a may extend upward in a same direction as the main wall 11 and may protrude upward from the main wall 11. An inclination of the upper wall 11a may be the same or similar to an inclination of the main wall 11 to provide a seamless appearance of the container 10a. Alternatively, the upper wall 11a may extend upward from the main wall 11 so as to be wider or narrower in the radial direction than the main wall 11.

The upper wall 11a may be formed with an upward projection or extension 114 protruding upward from the first protruding plate 111. A bumper 115 may be attached to an inner surface of the extension 114 and/or an upper surface of the first protruding plate 111. The bumper 115 may be made of an elastic material (e.g., rubber) and may therefore also be referred to as packing or cushioning. The water guide 50 may be placed on the upper wall 11a so that the upper inclined surface 513 may be in close contact with the bumper 115.

The bumper 115 may be formed to be in close contact with an outer wall or outer guide wall 51 of the water guide 50. The outer guide wall 51 of the water guide 50 may include the upper and lower inclined surfaces 513 and 514. See FIG. 10.

A projection 121 may be formed to protrude upward from a center of the bottom plate 12. The projection 121 may be formed by curving a center of the bottom plate 12 convexly upward such that the projection 121 has a hollow inner space. A first wireless power transfer device 72 (e.g., a wireless power transmitter and/or transceiver) may be installed in the inner space of the protrusion 121.

The bottom plate 12 may be formed integrally with the main wall 11. Alternatively, the bottom plate 12 may be formed separately from the main wall 11 and coupled with the main wall 11. The bottom plate 12 may be further formed with a ring-shaped groove or recess 122 recessed downward around the protrusion 121.

The main wall 11, the upper wall 11a, and the container support 11b may be made of the same material and integrally manufactured. Alternatively, the main wall 11, the upper wall 11a, and the container support 11b may be separately made of different materials and joined to each other to be integral with each other. The main wall 11 may be formed of a different material from the upper wall 11a and the container support 11b, and the upper wall 11a and the container support 11b may be formed of the same material. The upper wall 11a and the container support 11b may be made of a material to enhance aesthetic appeal (e.g., stainless steel). The main wall 11 may be made of a transparent material (e.g., glass).

The outer circumferential surface 116 of the container support 11b may be curvedly extended downward from a lower edge of the main wall 11. When an external impact is applied to the water tank 10 to tilt the water tank 10, a curvature of the outer peripheral surface 116 may roll such that the water tank 10 may return or be reoriented back to an initial orientation. The outer circumferential surface 116 may prevent the water tank 10 from completely overturning or spilling.

Furthermore, the curvature of the outer circumferential surface 116 may allow a user to easily lift the water tank 10 without needing to wedge or insert fingers between the outer circumferential surface 116 and a floor or ground surface. The user may place fingers in a space under a curved corner of the outer circumferential surface 116 and the floor to easily lift and balance the pet water dispenser.

A mounting portion 117 may be formed to extend from an inner surface of the container support 11b toward a center of the container support 11b. An upper surface of the mounting portion 117 may be provided under the bottom plate 12. A groove or recess may be formed in the mounting portion 117 to provide a mounting space where a water level sensor or load sensor 86 may be provided. The water level sensor 86 may be a strain gauge or load sensor that senses a weight of the water applied to the bottom plate 12. The controller C may determine the water level in the water tank 10 based on the weight sensed by the load sensor. Details of the mounting portion 117 will be provided in further detail with reference to FIGS. 11 and 12.

The main wall 11, the upper wall 11a, and the container support 11b may be welded or bonded together for integration. Further, the container support 11b may be formed so that the upper and lower sides thereof are open. The opened upper side of the container support 11b may be covered by the bottom plate 12 and the opened lower side of the container support 11b may be covered with a base plate 18. The container support 11b and the base plate 18 may form a base of the container 10a.

The base plate 18 may be spaced apart from and below the bottom plate 12. Various devices (e.g., thermoelectric element 81) described later may be installed in an inner space of the container support 11b between the base plate 18 and the bottom plate 12.

The base plate 18 may be placed on a docking station 71 and may be formed to have a circular shape. Ventilation holes or openings 181 may be formed in the base plate 18. The ventilation holes 181 may also be referred to as vents. A plurality of ventilation holes 181 may be formed so as to extend across the base plate 18. The plurality of ventilation holes 181 may be radially arranged along the circumferential direction of the base plate 18.

Referring to FIGS. 2 and 4, a power supply assembly of the pet water dispenser may include the docking station 71. The docking station 71 may include a weight 711 having a sufficient weight for balancing, a cylindrical protrusion or terminal 712 formed at a center of the weight 711 and including a first connection terminal, and an electrical wire 713 to apply external power from an external power source (e.g., socket) to the first connection terminal. The weight 711 may also be referred to as a main body of the docking station 71.

A circular groove 182 may be formed on a bottom surface of the base plate 18 and may be provided with a second connection terminal connected to the first connection terminal. The protrusion 712 may be inserted into the groove 182 of the base plate 18 to connect the first and second connection terminals and to rotatably couple the docking station 71 and the base plate 18. The first and second connection terminals may be configured to maintain an electrical connection when the docking station 71 and base plate 18 are rotated relative to each other. For example, at least one of the first and second connection terminals may include a circular electrode. Details of the first and second connection terminals are found in U.S. application Ser. No. 16/571,089, filed on Sep. 14, 2019, the entire contents of which is incorporated by reference herein. Therefore, even when the water tank 10 is rotated, a power supply to operate the pet water dispenser may be maintained without twisting the electrical wire 713.

A power circuit assembly 715 on a printed circuit board (PCB) may be installed in the inner space of the container support 11b and/or the inner space of the protrusion 121. The power circuit assembly 715 may be electrically connected or coupled to the second connection terminal of the base plate 18.

The first wireless power transfer device 72 may be electrically connected or coupled to the power circuit assembly 715 and provided below the bottom plate 12 in the protrusion 121. A second wireless power transfer device 73 (e.g., a wireless power receiver or transceiver to generate an induced voltage in response to a wireless power transmitter 72).

The first wireless power transfer device 72 may be provided in the inner space of the protrusion 121, and the second wireless power transfer device 73 may be provided in the inner assembly 100 in a space between a lower filter cover 43 and the pump 20. When the inner assembly 100 is installed in the water tank 10, the lower filter cover 43 may be inserted onto the protrusion 121 and the first and second wireless power transfer devices may be aligned with each other so that power may be generated via electromagnetic induction.

For convenience of description, the first wireless power transfer device 72 will be described as a wireless power transmitter that generates a current and an electromagnetic field, and the second wireless power transfer device 73 will be described as a wireless power receiver that generates an induced current from the electromagnetic field. However, embodiments disclosed herein are not limited to a wireless power transmitter 72 provided under the bottom plate 12 and a wireless power receiver 73 provided above the bottom plate 12. For example, the first wireless power transfer device 72 may be a wireless power receiver, and the second wireless power transfer device 73 may be a wireless power transmitter. As another alternative, the first wireless power transfer device 72 may include both a wireless power receiver and transmitter, and the second wireless power transfer device 73 may include both a wireless power receiver and transmitter such that power may be transferred in either direction between the first and second wireless power transfer devices 72 and 73.

A chamber or space S may be formed in an inner space of the inner guide wall 53 of the water guide 38 between the partition plate 38 and an upper filter cover 46. The sealed space S may be a dry space sealed from the water tank 10. The battery B and the controller C may be installed in the sealed space S.

The wireless power receiver 73 may be connected to the battery B provided in the sealed space S via an electric wire, and/or the wireless power receiver 73 may generate inductive power to charge the battery B. The battery B may supply power to the pump 20.

Since the battery B is provided in the inner assembly 100, the pump 20 may be operated by electric power supplied from the battery B even if the external power supplied through the electrical wire 713 is disconnected or disabled or the docking station 71 is not provided. Even if a position of the inner assembly 100 is slightly disturbed such that the wireless power receiver and transmitter 73 and 72 are displaced or misaligned, the pet water dispenser may continue to operate via electric power supplied from the battery B.

Figure 5:
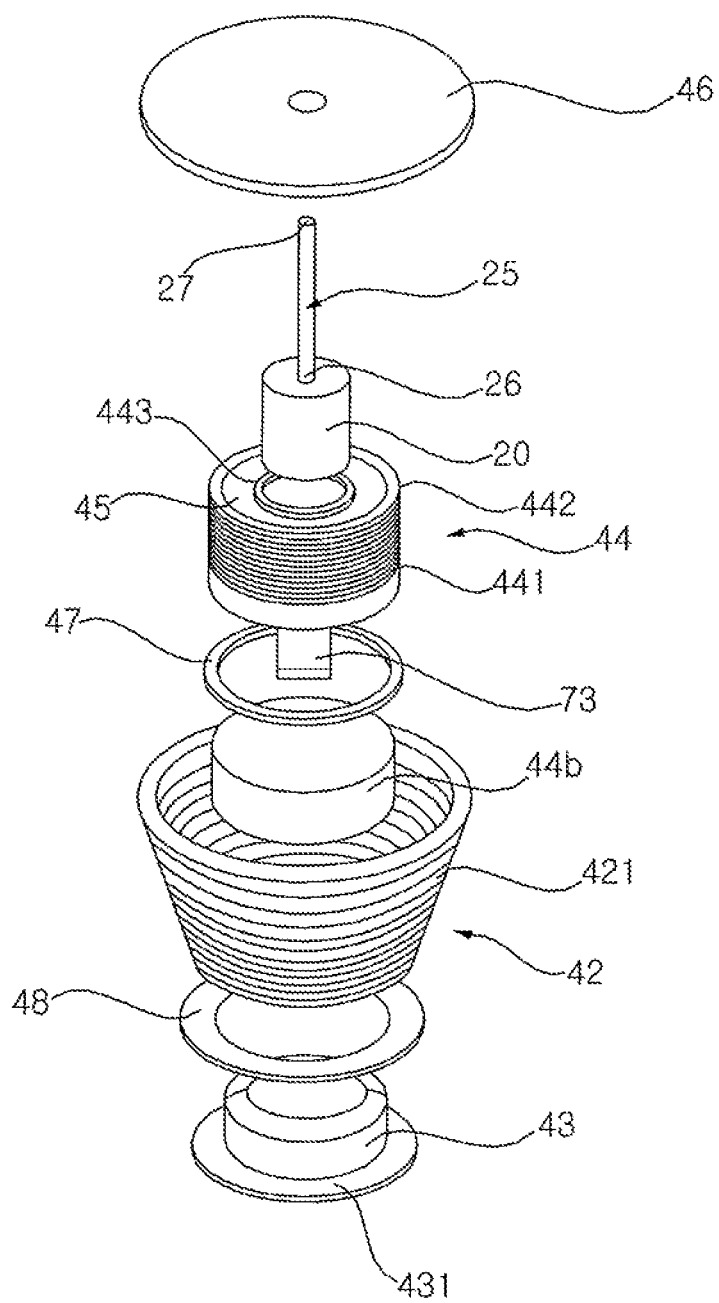
FIG. 5 is an exploded perspective view showing a filter and the pump shown in FIG. 2.
Figure 6:
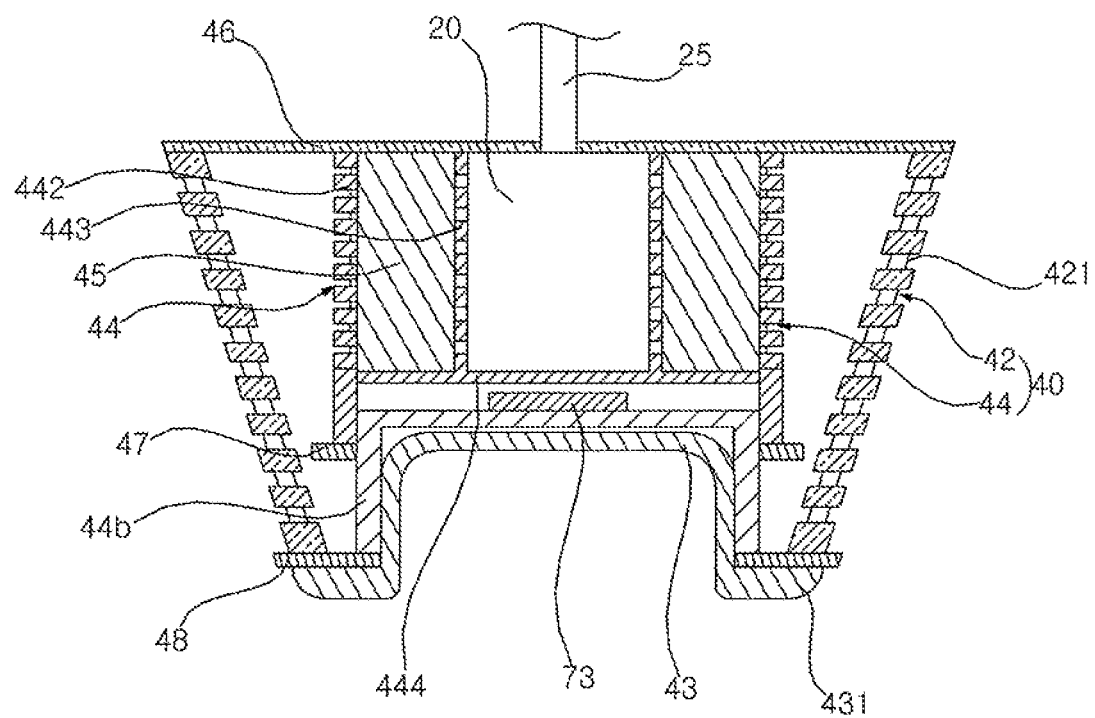
FIG. 6 is a side sectional view of the filter and the pump shown in FIG. 2.
Figure 7:
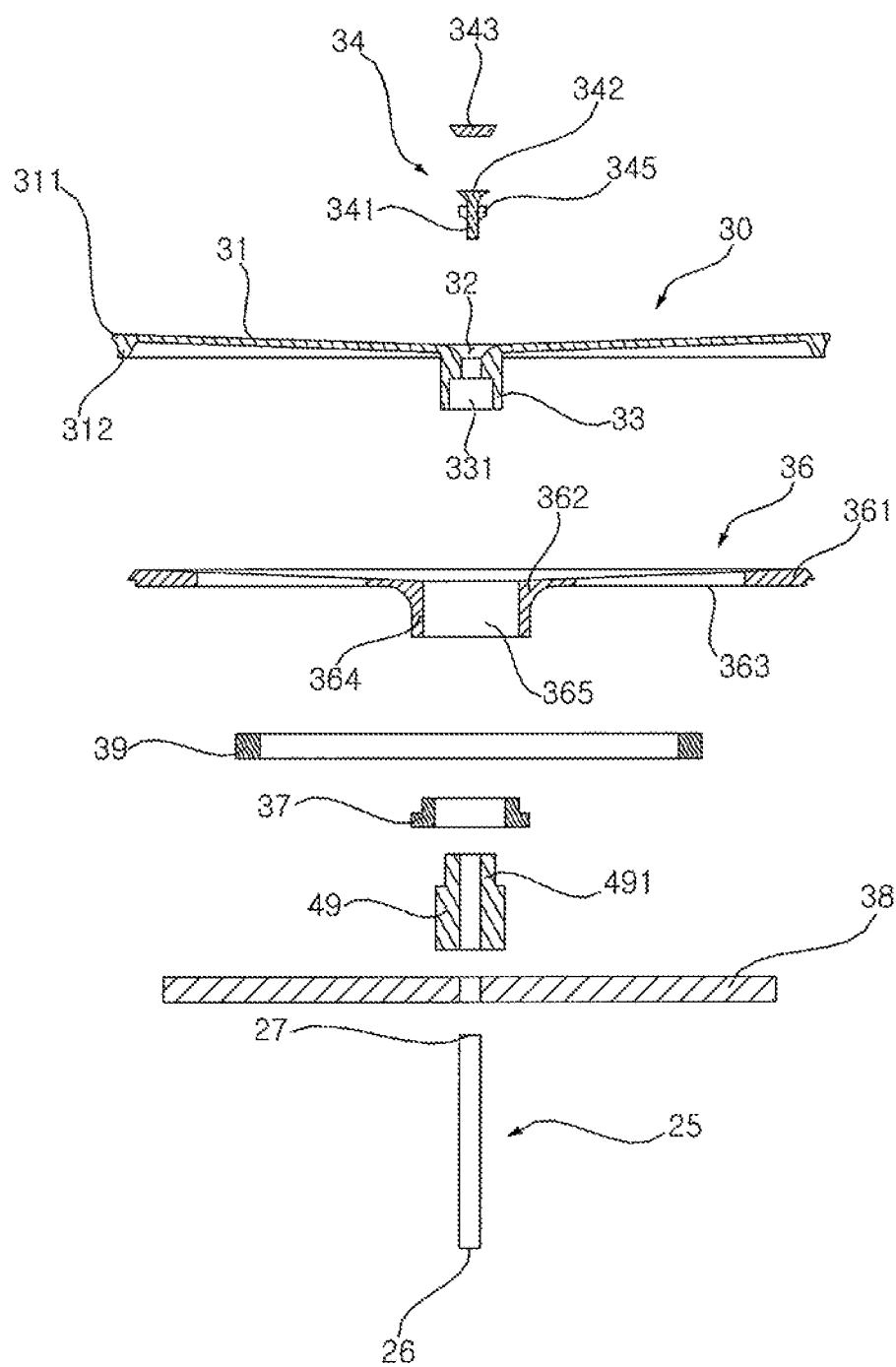
FIG. 7 is a view of the components being assembled to a water supply plate shown in FIG. 2.

Referring to FIGS. 2, 5, and 6, the filter assembly 40 may be formed in a cylindrical or truncated cone shape. The pump 20 may be provided inside the filter assembly 40. A plurality of through holes 421 and 441 may be formed in a circumferential direction on circumferential surfaces of the filter assembly 40. When the pump 20 is installed in an inner space of the filter assembly 40, a filtration performance and a pumping efficiency may be improved, and the pump 20 may be maintained stably in a predetermined position without an additional fixing structure.

The filter assembly 40 may include a first filter 42 and a second filter 44. The second filter 44 may be provided inside the first filter 42. The pump 20 may be provided within the second filter 44. The plurality of through holes 421 may be formed throughout the circumferential surface of the first filter 42, and the plurality of through holes 441 may be formed throughout the circumferential surface of the second filter 44.

The first filter 42 may be formed in a cylindrical or truncated cone shape and of a rigid material (e.g., stainless steel). The plurality of through holes 421 may be formed in a wall of the first filter 42. The wall may form the circumferential surface of the first filter 42 and may be inclined inward from an upper end to a lower end. The first filter 42 may therefore have an increasing diameter from the lower end to the upper end.

The first filter 42 may filter foreign substances having a particle size larger than a size of the through holes 421. For example, when a pet licks water on the upper surface 31 of the water supply plate 30, food in the mouth or on the snout of the pet may be dropped and mixed with the water stored in the water tank 10. The first filter 42 may prevent such foreign matter having a particle size larger than the through hole 421 from passing through the through hole 421.

The first filter 42 may be opened at upper and lower ends. The first filter 42 may include a lower filter cover or cap 43 provided to cover the lower end. The lower filter cover 43 may be formed separately from the first filter 42 and later combined with the first filter 42. Alternatively, the lower filter cover 43 may be formed as a single body with the first filter 42.

The lower filter cover 43 may be inserted onto the projection 121 formed on the bottom plate 12 of the water tank 10. The lower filter cover 43 may be formed so as to be convex upward so as to cover the protrusion 121. An inner surface of the lower filter cover 43 may be configured to have a shape corresponding to an outer surface contour of the protrusion 121. The protrusion 121 may be inserted into the lower filter cover 43.

A flange 431 may be formed at an edge of the lower filter cover 43. The flange 431 may be inserted into the groove 122 formed around the protrusion 121 of the bottom plate 12. The first filter 42 may therefore be secured at a predetermined position on the protrusion 121 without being moved in a horizontal or lateral direction.

The second filter 44 may be provided in a hollow portion or inner space of the first filter 42, and the pump 20 may be installed in a hollow portion or inner space of the second filter 44. The second filter 44 may comprise a filter housing and a filtration material 45 (e.g., a carbon filter). The filter housing may include an outer wall 442 formed with the plurality of through holes 441 and an inner wall 443 spaced apart from the outer wall 442 and also having a plurality of through holes. The filtration material 45 may be filled in a space formed between the outer wall 442 and the inner wall 443.

The outer wall 442 and the inner wall 443 may be formed vertically so as to be cylindrical. The plurality of through holes 441 may be formed throughout the outer wall 442. Alternatively, the plurality of through holes 441 may be formed throughout an upper section of the outer wall 442. The plurality of through holes of the inner wall 443 may be formed throughout the inner wall 443. The plurality of through holes 421, 441, and those of the inner wall 443 may be formed as circumferential slits. The filtration material 45 may filter foreign matter having a smaller particle size than the through hole 441 formed in the outer wall 442.

A support cylinder 44b may be optionally installed inside the first filter 42 below the second filter 44. The wireless power receiver 73 may be provided on the support cylinder 44b. The lower filter cover 43 may be inserted into the support cylinder 44b, and a top surface of the support cylinder 44b may close an opened lower end of the second filter 44. The support cylinder 44b may be hollow so that the lower filter cover 43 may be inserted into an opened lower side of the support cylinder 44b.

The second filter 44 may be formed with a support plate 444 to support a lower side of the filtration material 45 and a lower side of the pump 20. The outer wall 442 of the second filter 44 may project below the support plate 444. The support plate 444 may therefore divide the second filter 42 between upper and lower sections. The lower section of the outer wall 442 may be coupled to an outer side surface of the support cylinder 44b.

The lower end of the first filter 42 may be seated on the upper surface of the flange 431 of the lower filter cover 43. A first UV filter 47 may be provided on the lower end of the outer wall 442 of the second filter 44. A second UV filter 48 may be provided on an upper surface of the flange 431, and the lower end of the first filter 42 and a lower end of the support cylinder 44b may be provided on the second UV filter 48. The second UV filter 48 may be formed in a ring shape. The second UV filter 48 may therefore be referred to as an engagement ring or portion.

An upper end of the support cylinder 44b may be coupled to the lower end of the second filter 44. A spiral or threads may be formed on an inner peripheral surface of the lower end of the second filter 44, and a corresponding spiral or threads may be formed on an outer peripheral surface of the upper end of the support cylinder 44b. The spiral or threads of the second filter 44 and the spiral or threads of the support cylinder 44b may be engaged with each other so that the second filter 44 and the support cylinder 44b may be screwed to each other.

The wireless power receiver 73 may be seated on an upper surface of the support cylinder 44b, and the upper surface of the support cylinder 44b and the support plate 444 may each couple to the outer wall 442 second filter 44 to create a sealed or dry space between the support plate 447, the upper surface of the support cylinder 44b, and the lower section of the outer wall 443. Therefore, there may not be any through holes 441 on the lower section of the outer wall 442.

The pump 20 may be provided inside the inner wall 443 of the second filter 44. The water having passed through the first filter 42 and the filtration material 45 is sucked into the pump 20 through the through holes formed in the inner wall 443 of the second filter 44.

A first UV filter 47 may be provided on an upper peripheral or side surface of the support cylinder 44b, and may be formed to have a ring shape. The first UV filter 47 may include a plurality of first UV LEDs spaced apart from each other along a circumferential direction. The first UV filter 47 may dissolve or kill bacteria or other foreign substances in the water introduced into the first filter 42 by diffusing the light or radiation generated by the plurality of first UV LEDs.

The plurality of first UV LEDs may be spaced from each other along the circumferential direction on an inner circumferential surface of the first UV filter 47. Therefore, the light generated by the plurality of first UV LEDs may be irradiated radially outward from the first UV filter 47.

The second UV filter 48 may be installed on a lower surface of the wall of the first filter 42. The second UV filter 48 may include a plurality of second UV LEDs spaced apart from each other along a circumferential direction. The second UV filter 48 may dissolve or kill bacteria or other foreign substances in the water stored in the water tank 10 by diffusing light or radiation generated by the plurality of second UV LEDs.

The plurality of second UV LEDs may be spaced from each other along the circumferential direction on an inner circumferential surface of the second UV filter 48. Therefore, the light generated by the plurality of first UV LEDs may be irradiated radially outward from the second UV filter 48.

The filter assembly 40 may be opened at upper and lower ends. The upper filter cover 46 may cover the open upper end of the filter assembly 40 and the lower filter cover 43 may cover the open lower end of the filter assembly 40.

The upper filter cover 46 may be placed on the upper ends of the first and second filters 42 and 44. The water supply pipe 25 may penetrate the upper filter cover 46. The upper filter cover 46 may seal an upper side of the pump 20 and upper sides of the first and second filters 42 and 44. The first and second filters 42 and 44 and the upper filter cover 46 may be joined together by a method such as adhesion or fusion so as to be integral with each other. Alternatively, the first and second filters 42 and 44 may be assembled to be detachable from each other by a female hook member and a male hook member which engage with each other or by a screw method.

The lower end of the support cylinder 44b may be covered by the lower filter cover 43. The support cylinder 44b and the lower filter cover 43 may be formed integrally as one piece, or may be made separately and later attached to each other.

When the lower filter cover 43 is formed integrally with the first filter 42 or when the lower filter cover 43 is formed separately from the first filter 42 and combined with the first filter 42, the support cylinder 44b may be placed on the lower filter cover 43. When the lower filter cover 43 is formed integrally with the support cylinder 44b or the lower filter cover 43 is formed separately from the support cylinder 44b and joined with the support cylinder 44b, the filter 42 may be placed on the flange 431 of the lower filter cover 43.

At least one of the first and second filters 42 and 44 may be optional. Alternatively, additional filters may be included.

A water inlet 26 may be formed at a lower end of the water supply pipe 25 and a water outlet 27 may be formed at an upper end of the water supply pipe 25. The water discharged from the pump 20 flows into the water supply pipe 25 through the water inlet 26, is moved along the water supply pipe 25, and is then discharged to the outside of the water supply pipe 25 through the water outlet 27.

Referring to FIGS. 2 and 7-9, the water supply plate 30 may be formed of a plate having a flat and smooth upper surface 31. A water supply hole 32 may be formed at a center of the water supply plate 30. The water supply hole 32 may communicate with the water outlet 27 of the water supply pipe 25.

A first boss 33 may be formed to protrude downward from a lower surface of a central portion of the water supply plate 30, and the water supply hole 32 may be formed to penetrate the first boss 33 in the vertical direction.

The water supply hole 32 may supply the water supplied from the water supply pipe 25 to the upper surface 31 of the water supply plate 30. The water moved to the upper surface 31 of the water supply plate 30 through the water supply hole 32 may be returned to the water tank 10 from the edge 311 of the water supply plate 30 and the water guide 50.

The water that has been moved to the upper surface 31 of the water supply plate 30 via the water supply hole 32 may flow to the edge 311 of the water supply plate 30. The water that has flowed to the edge 311 of the water supply plate 30 may reach the water guide 50 either directly or via the inclined surface 63C of the support 63. The water guide 50 may receive water flowing downward from the inclined surface 63C of the support 63 or falling off the edge 311 of the water supply plate 30, and supply the water back to the water tank 10.

Although the water supply plate 30 is illustrated as a disc, it may be formed in a different shape. For example, the water supply plate 30 may be formed in a rectangular plate shape, a hexagonal shape, or a triangular plate shape.

The upper surface 31 may have a sloped surface with a higher edge 311 and a lower center. Alternatively, the upper surface 31 may be sloped such that the edge 311 may be lower than the center. The edge 311 of the water supply plate 30 may be formed with an edge protrusion 312 slightly protruding downward from the lower surface of the water supply plate 30.

An upper portion or head of the water supply hole 32 may have a diameter that increases from a lower portion or stem to the upper surface 31. The stem of the water supply hole 32 may be narrower than the head of the water supply hole 32, and the water supple hole 32 may therefore have a trumpet shape.

A nozzle stopper or plug 34 may be at least partially inserted into the water supply hole 32. A lower end or stem 341 of the plug 34 may be at least partially inserted into the water supply hole 32, and a upper end or head 342 of the plug 34 may be spaced upward from the water supply hole 32. Alternatively, the plug 34 may be a float which moves up and down based on water flowing out of the water outlet 27 of the water supply pipe 25, and the float may completely close the water supply hole 32 when the pump 20 is turned off.

An outer peripheral surface of the head 342 may include at least one inclined surface that is sloped outward from an upper end of the stem 341 to an upper end of the head 342. Water discharged from the water outlet 27 of the water supply pipe 25 may strike the outer peripheral surface of the head 341 and spread to a side or the edge 311 of the water supply plate 30. The water spouting from the water supply hole 32 may therefore form a water wall or water film spread around the edge 311 of the water supply plate 30.

The plug 34 may include a head cover 343 coupled to the head 342. The lower end of the stem 341 may be inserted into the water supply hole 32. A plurality of engaging pieces or ribs 345 spaced apart from each other in a circumferential direction of the stem 341 may be formed on the circumferential surface of the stem 341. The head 342 may be formed above the stem 341. The head cover 343 may be coupled to the head 342. The head cover 343 may be formed separately from the head 342 and coupled to the head 342 or may be integrally formed with the head 342.

The head cover 343 may be slightly spaced apart from and provided above the water supply hole 32 when the stem 341 of the plug 34 is inserted into the water supply hole 32. An outer circumferential surface of the head cover 343 may be formed as an inclined surface that is inclined outward from the upper end of the head 342 to an upper end of the head cover 343. The water discharged from the water outlet 27 may collide with an outer peripheral surface of the head cover 343 and spread to the side of the water supply plate 30.

The water outlet 27 the water supply pipe 25 may be inserted into the water supply hole 32 or provided below the water supply hole 32 so that the water outlet 27 may communicate with the water supply hole 32.

The ribs 345 protruding from the outer circumferential surface of the stem 341 may be brought into contact with a part of the upper surface 31 that forms the water supply hole 32 so that the plug 34 may be supported at a predetermined position of the water supply hole 32. The water discharged from the water outlet 27 may be supplied to the center of the upper surface 31 while being sprayed in the form of a ring through the water supply hole 32 against the head 342 of the plug 34, The water may then flow along the upper surface 31 toward the edge 311 of the water supply plate 30. Alternatively, the ribs 345 may be captured within the water supply hole 32. The water supply hole 32 may include grooves to allow the ribs 345 to move up and down based on water being pumped when the plug 34 serves as a float.

The water supply plate 30 may be made of stainless steel. Alternatively, the water supply plate 30 may be made of a transparent or semi-transparent material to transmit light from illumination assembly 60 to an outside of the water supply plate 30. The water supply plate 30 may be formed to have a thin thickness.

A plate support 36 to support the water supply plate 30 may be provided below the water supply plate 30. The plate support 36 may be supported by a light base or support 62 and/or the support or light diffuser 63, which will be described later.

The plate support 36 may include an outer ring 361 abutting against the edge protrusion 312, a hub or inner ring 362 positioned centrally, and a plurality of spokes 363 extending between the outer and hub rings 361 and 362, A boss or second boss 364 may protrude from the lower side of the hub ring 362. The first boss 33 of the water supply plate 30 may be inserted into a hole 365 formed through the hub ring 362 and the second boss 364. A sealing ring 37 may be forcedly inserted between the first boss 33 formed in the water supply plate 30 and the second boss 364 formed in the plate support 36. The sealing ring 37 may be made of an elastic material (e.g., rubber) and may also be referred to as a packing ring.

The water supply pipe 25 may be provided below the water supply plate 30 and penetrate through the partition plate 38 located below the plate support 36, and the water outlet 27 may be connected to the water supply hole 32 of the water supply plate 30. A third UV filter 49 to sterilize water passing through the water supply pipe 25 or discharging from the water outlet 27 may be provided around the water supply pipe 25. The third UV filter 49 may be formed in a cylindrical shape having a length in the vertical direction. The upper end of the water supply pipe 25 may at least partially pass through the third UV filter 49.

The third UV filter 49 may comprise a plurality of third UV LEDs spaced apart from each other along a circumferential direction. The third UV filter 49 may dissolve or kill bacteria or foreign substances in the water via UV radiation generated from the plurality of third UV LEDs to sterilize water discharged from the water outlet 27 of the water supply pipe 25. The plurality of third UV LEDs may be provided on a lower surface of the third UV filter 49 along the circumferential direction. Accordingly, the light generated by the plurality of third UV LEDs may be irradiated to an upper side of the third UV filter 49.

A hole 331 extending downward from the water supply hole 32 may be formed in a lower portion of the first boss 33 formed in the water supply plate 30. The hole 331 may be formed to be wider than the water supply hole 32. The hole 331 may be an insertion hole into which an upper end or portion 491 of the third UV filter 49 is inserted.

The upper end 491 of the third UV filter 49 may be formed to be smaller in diameter than a remaining portion or lower end of the third UV filter 49. An upper end or portion of the sealing ring 37 may be formed to be smaller in diameter than a remaining portion or lower end of the sealing ring 37, and may be inserted between the first and second bosses 33 and 364.

The lower end of the sealing ring 37 may support a lower side of the second boss 364. The lower end of the third UV filter 49 may be inserted into the lower end of the sealing ring 37. The lower end of the third UV filter 49 may be placed on the partition plate 38.

The water supply pipe 25 may at least partially penetrate the interior of the third UV filter 49. The upper end of the third UV filter 49 may be installed at a same position as the water outlet 27, or alternatively may be installed so as to cover a position higher than the water outlet 27 so as to directly irradiate UV light to the water discharged from the outlet 27.

A reinforcing ring 39 may be provided on a bottom surface of the plate support 36. The reinforcing ring 39 may be supported by reinforcing ribs 621 of the light base 62.

The water supply plate 30 may be detachably assembled to the inner assembly 100. The water supply plate 30 may be pulled or lifted upward to overcome an elastic force of the sealing ring 37 to be separated from the plate support 36. The user may replace the water supply plate 30 with another water supply plate having a different shape, height, material, or angle of inclination after separating the water supply plate 30 from the plate support 36.

Figure 9:
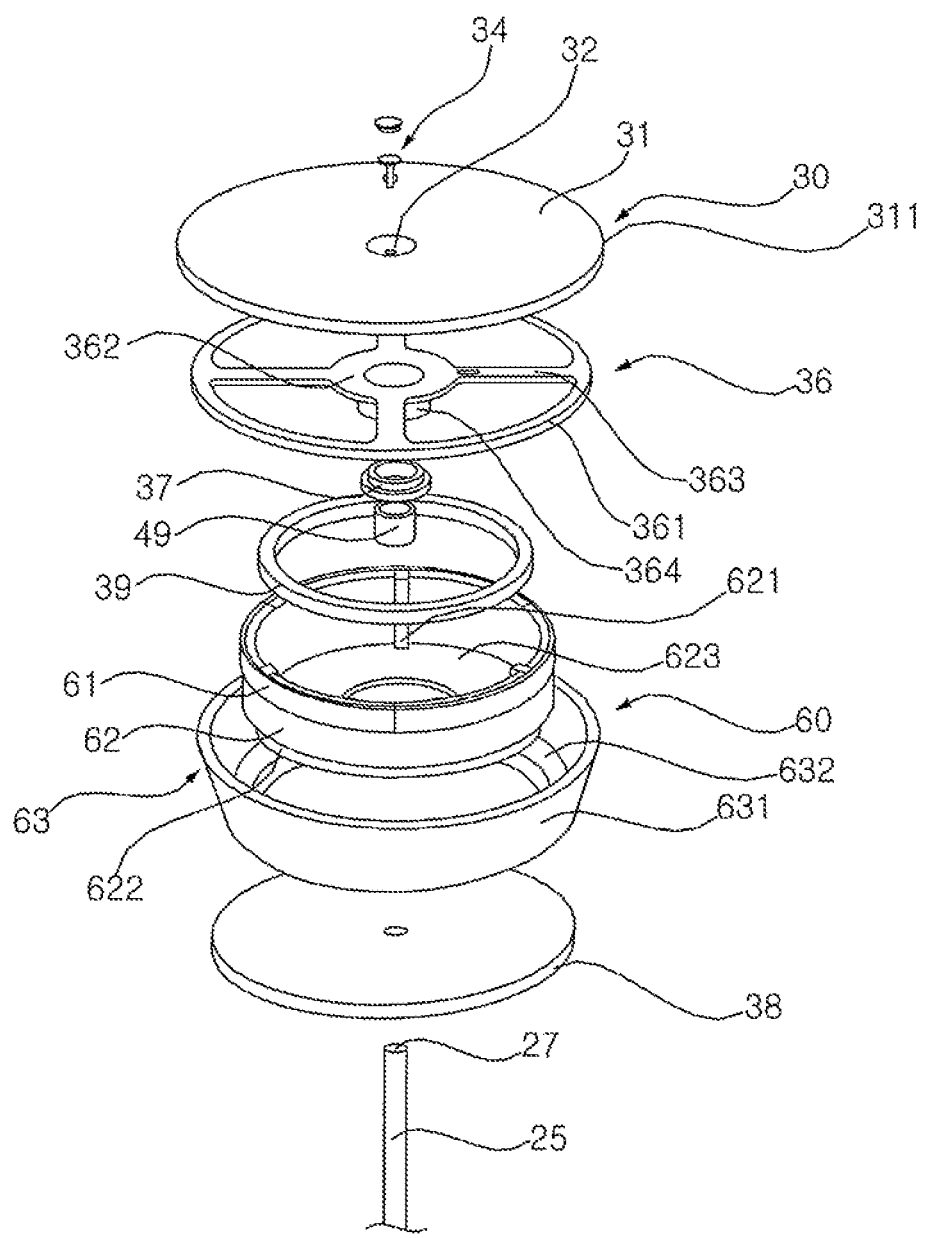
FIG. 9 is an exploded perspective view of FIG. 8.

Referring to FIGS. 8-9, an illumination assembly 60 may be installed below the water supply plate 30 and the plate support 36. The illumination assembly 60 may include a light emitting device or light device 61, a light support or base 62 on which the light device 61 is installed, and a support 63 provided on a periphery of the light base 62. The support 63 may be formed in a truncated cone shape, while the light base 62 may be formed in a cylindrical shape provided within an inner space of the support 63.

The support 63 may be formed to have a wider diameter toward the upper end 63a. The upper end 63a of the support 63 may be in contact with the edge protrusion 312 of the water supply plate 30 and the outer ring 361 of the plate support 36. The lower end 63b of the support 63 may be brought into contact with the partition plate 38.

The outer circumferential surface 631 of the support 63 may be an inclined surface gradually inclined inward from the edge 311 of the water supply plate 30. The water dropped from the edge 311 may fall vertically without flowing along the support 63. The dropping of water creates a waterfall to stimulate running water, which is pleasing for animals.

The light device 61 may be formed of a plurality of light emitting diodes (LEDs). The light devices 61 may be attached to and installed on the light base 62, and may be formed in an array of predetermined shapes or a ring shape. The light base 62 may therefore also be referred to as a light mount.

At least one reinforcing rib 621 may be formed on an inner surface of the light base 62. The at least one reinforcing rib 621 may support a reinforcing ring 39.

A recessed portion or recess 622 may be formed on the outer surface of a lower end of the light base 62. An inward protrusion 632 protruding inwardly from the lower end 63b of the support 63 may be inserted into the recess 622.

The light device 61 may be formed in a ring shape, and may be installed on an outer surface of an upper end of the light base 62. A concave portion or recess 62a may be formed on the outer surface of the upper end of the light base 62. The light device 61 may be inserted and attached to the recess 62a.

A printed circuit board (PCB) 623 to control a light emission of the light device 61 may extend horizontally from the inner surface of the light base 62 at a lower end so as to be placed on an upper surface of the partition plate 38. The light base 62, the support 63, and the partition plate 38 may be bonded or welded together. Alternatively, the light base 62, the support 63, and the partition plate 38 may be assembled to be detachable from each other.

Figure 10:
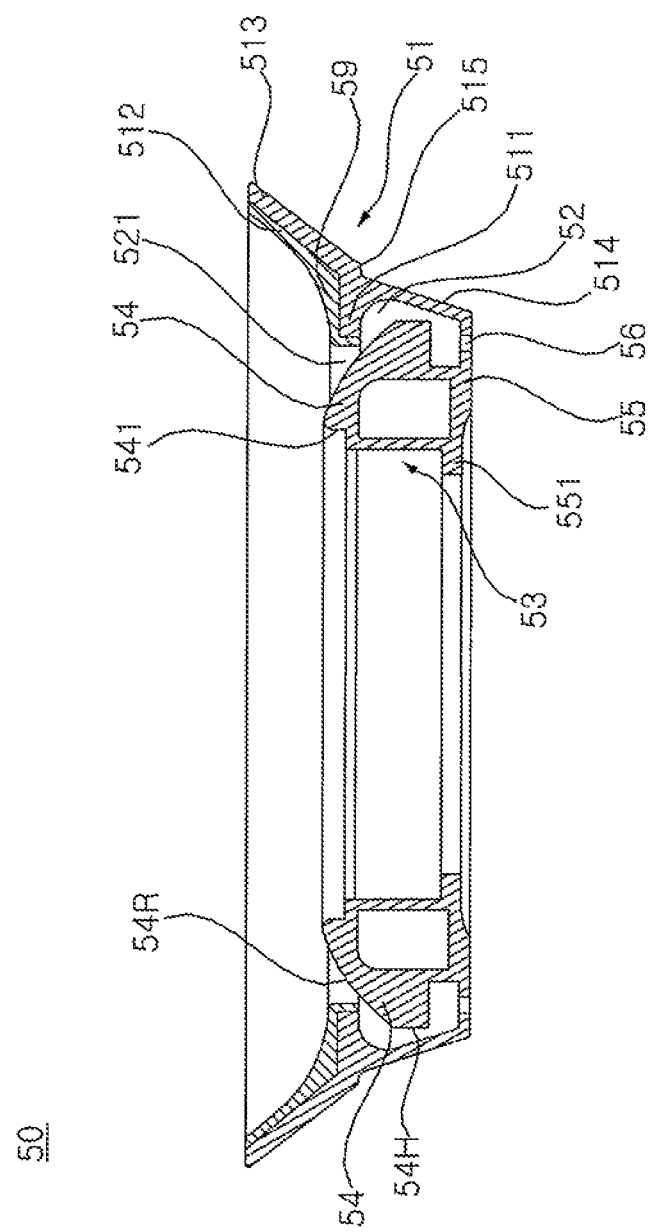
FIG. 10 is a side sectional view showing a water guide shown in FIG. 2.

Referring to FIG. 10, the water guide 50 may be provided below the water supply plate 30 to cover the opened upper side of the water tank 10 to catch water falling from the edge 311 and guide the water to the water tank 10. The water guide 50 may include an outer guide wall 51 forming an outer rim and an inner guide wall 53 forming an inner rim. A drain passage 52 may be formed between the outer and inner guide walls 51 and 53. The water guide 50 may further include a bottom wall 55 connecting lower ends of the outer and inner guide walls 51 and 53. The bottom wall 55 may be provided with a discharge hole 56 communicating with the drain passage 52 to discharge the water supplied to the water guide 50 into the water tank 10. The discharge hole 56 may be formed of at least one arc-shaped hole, a ring-shaped hole, or a circular hole formed along a circumferential direction of the bottom wall 55.

The lower end 63a of the support 63 may be provided on the inner guide wall 53. A guide 54 may be formed on an upper surface of the inner guide wall 53. The guide 54 may protrude toward the outer guide wall 51 and may be inclined downward. The guide 54 may also protrude from the lower end 63b of the support 63.

The guide 54 may receive water flowing down the inclined surface 631 of the support 63 and guide the water downward. Further, the guide 54 may receive the water falling off the edge 311 of the water supply plate 30 and guide the water downward. The outer surface of the guide 54 may include a convex round surface 54R that is curved outwardly. The round surface 54R may be formed at a predetermined interval from the lower end 63b of the support 63 downward.

The water flowing downward along the inclined surface 63C may be slowed down by the round surface 54R and the water may be discharged through the discharge hole 56 formed in the bottom wall 55. The noise generated from water falling in the water tank 10 may be reduced due to the decreased speed of the water flowing over the guide 54.

An outer surface of the guide 54 may further include a vertical surface 54H extending downward from a lower end of the round surface 54R. The vertical surface 54H may be spaced apart from and provided above the bottom wall 55.

The guide 54 may be provided lower than an upper end of the outer guide wall 51. The outer guide wall 51 may prevent the water dropped from the edge 311 of the water supply plate 30 or water splashed from the surface of the guide 54 from being ejected outside the water tank 10. Although the guide 54 is shown to be formed on the inner guide wall 53 of the water guide 50, the guide 54 may alternatively be formed on the outer guide wall 51 to protrude toward the inner guide wall 53.

An upper end of the guide 54 may be in contact with and support the lower end 63b of the support 63. A groove 541 may be formed in the upper end of the guide 54. The lower end 63b of the support 63 may be placed on the partition plate 38 after the partition plate 38 is positioned in the groove 541. Alternatively, both the lower end 63b of the support 63 and the partition plate 38 may be placed on the groove 541 to be adjacent to each other. Further, a protruding portion that protrudes from the lower end 63b of the support 63 may rest on the guide 54 (FIG. 2). A lower surface of a lower portion of the light guide 53 may be configured to correspond to an upper surface of the guide 54 that is adjacent to the groove 541.

The water guide 50 may be assembled to be detachable from the light diffuser 63 and the partition plate 38. Alternatively, the water guide 50 may be more permanently joined (e.g., adhered to or fused) to the support 63 and the partition plate 38. When the water guide 50 is assembled to be detachable from the support 63 and the partition plate 38, the water guide 50 may be replaced with a water guide having a different shape or height.

A protrusion 511 may be formed on an inner side surface of the outer guide wall 51 to protrude toward the guide 54. An inner peripheral surface 512 of the outer guide wall 51 extending upward from the protruding portion 511 may be formed as an inclined surface that widens toward an upper end of the outer guide wall 51. A narrow drainage passage 521 may be formed between the protrusion 511 and the guide 54.

The water dropped from the water supply plate 30 into the water guide 50 may flow through the narrow drainage passage 521 after flowing over the guide 54 and the protrusion 511 for a relatively long time. Foreign matter may be filtered by the extension 511 and may not pass through the narrow drainage passage 521.

A covering or coating layer 59 may be formed on the inner peripheral surface 512 and an upper surface of the protrusion 511. The coating layer 59 may be formed of a material different from that of the water guide 50. The guide 54 may be formed of a material different from the water guide 50, so that the aesthetics may be improved or so a tactile feel may be smooth, and the falling water may be prevented from being scattered.

The upper end of the outer guide wall 51 may be formed to be higher than the inner guide wall 53 so as to project upward and outward beyond the upper wall 11a. The outer guide wall 51 may be formed to be wider than the extension 114 of the upper wall 11a. Referring to FIG. 2, a predetermined angle θ may be formed between the outer guide wall 51 and the extension 114. The predetermined angle θ may be, for example, 120 degrees.

Referring to FIGS. 2 and 10, the upper inclined surface 513 and the lower inclined surface 514 may be formed on an outer surface of the outer guide wall 51. The upper and lower inclined surfaces 513 and 514 may have different inclinations or slopes. A step portion 515 may be formed between the upper inclined surface 513 and the lower inclined surface 514. The step portion 515 may be formed at a position corresponding to a lower surface of the protrusion 511.

The lower inclined surface 514 may be an outer inclined surface supported by the inner tank wall 113 of the water tank 10. The step portion 515 of the water guide 50 may be seated on the upper surfaces of the first protruding plate 111. The upper inclined surface 513 may be supported by the bumper 115 attached to the upper wall 11a. The water guide 50 may therefore be securely positioned above the water tank 30 in a state in which it is caught by the upper wall 11a of the water tank 30.

A protruding jaw or extension 551 may be formed on an inner surface of the inner guide wall 53. The extension 551 may be formed to extend inward to form a bottom portion of the water guide 50. The extension 551 may be provided on an edge of the upper filter cover 46 described above. The upper filter cover 46 may be coupled to the extension 551 to cover an open inside of the extension 551, which may be an open lower end of the water guide 50

The extension 551 and the upper filter cover 46 may be detachably assembled by a known means such as an arm, a hook, or a screw. Alternatively, the extension 551 and the upper filter cover 46 may be joined to not be separated, such as by fusion or adhesion.

As described above, the filter assembly 40, the pump 20, the water supply pipe 25, the water supply plate 30, the illumination assembly 60, and the water guide 50 may be integrally combined or assembled to form a single inner assembly 100. The inner assembly 100 may be easily separated from the water tank 10, the water in the water tank 10 may be easily exchanged, and the pet water dispenser may be easily cleaned or repaired.

When the inner assembly 100 is installed in the water tank 10, the water guide 50 may be caught by the upper wall 11a of the water tank 10 because the step portion 515 may be provided on the first protruding plate 111, the upper inclined surface 513 may be supported by the bumper 115, and the lower inclined surface 514 may be supported by the inner tank wall 113. Furthermore, when the inner assembly 100 is installed in the water tank 10, the lower filter cover 43 may be provided on the protrusion 121 formed on the bottom plate 12 and the flange 431 may be inserted into the groove 122. When the inner assembly 100 is installed in the water tank 10, the inner assembly 100 may be secured and maintained at a predetermined position. When the user lifts the outer guide wall 51, the inner assembly 100 may be detached or removed from the water tank 10.

Figure 11:
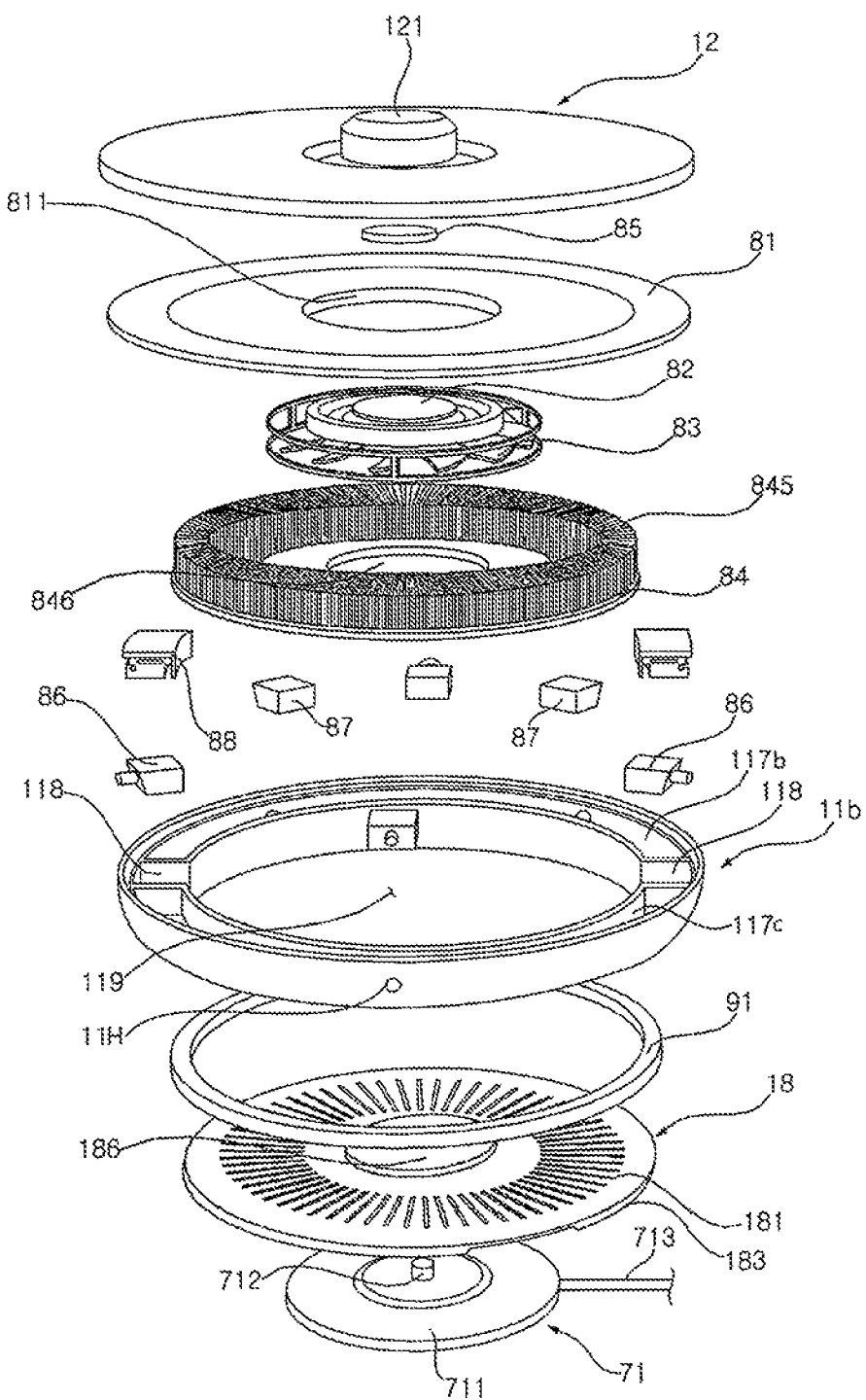
FIG. 11 is an exploded perspective view showing various electronic devices installed in a container support of a water tank.
Figure 12:
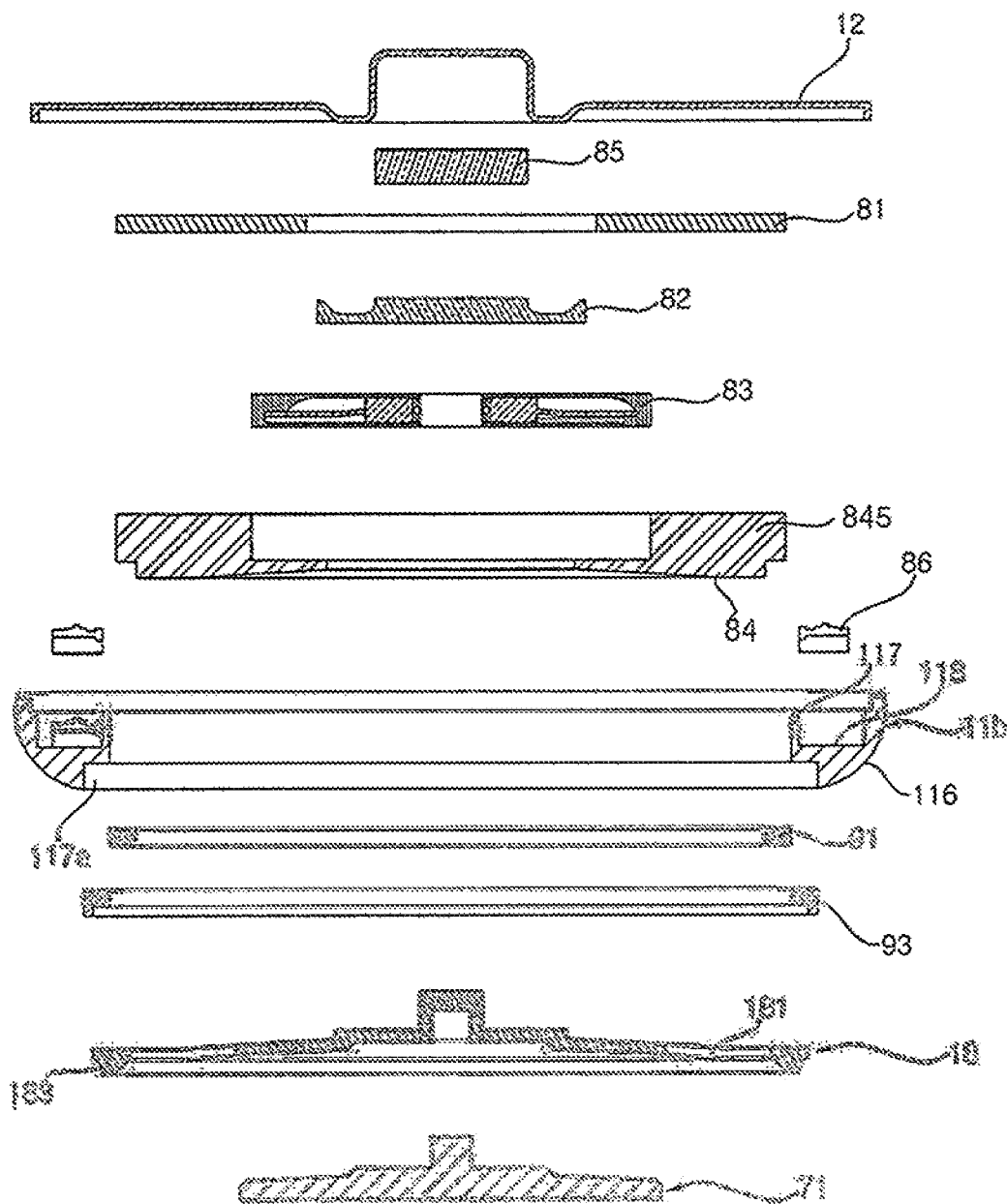
FIG. 12 is a side sectional view of FIG. 11.

Referring to FIGS. 11 and 12, various electronic devices may be installed in the inner space of the container support 11b between the bottom plate 12 and the base plate 18. The base plate 18 may be provided below the container support 11b so that the container support 11b may be separated from the floor where the pet water dispenser is placed. At least one base leg or leg 183 may protrude from the bottom of the base plate 18 to separate the base plate 18 from the floor. A plurality of base legs 183 spaced from each other along the circumferential direction of the base plate 18 may be provided at a lower edge of the base plate 18.

An insertion protrusion or step portion 186 may protrude from a center of an upper surface of the base plate 18. The step portion 186 may be formed in a circular shape. The plurality of ventilation holes 181 may be radially arranged along the circumferential direction of the base plate 18. The plurality of ventilation holes 181 may be formed to be spaced outwardly from the step portion 186.

The container support 11b may be provided with an inner space 119 having upper and lower openings and formed within the mounting portion 117. The container support 11b may be formed in a ring shape. The mounting portion 117 may include a first inner wall 117b forming an inner circumferential surface of the container support 11b that is opposite to the outer circumferential surface 116, and a second inner wall 117c spaced apart from the first inner wall 117b.

A sidewall 118 may extend between the first and second inner walls 117b and 117c. The sidewall 118 may be a solid wall or block having an upper surface, which may be recessed to form a mounting space for the proximity sensor 87, the gyro sensor 88, and water level sensor 86. Alternatively, the sidewall 118 may be a two-dimensional wall, and a bottom wall may be provided between the first and second inner walls 117b and 117c to close a bottom opening formed by the first and second inner walls 117b and 117c and the sidewall 118. The sidewall 118 may have a predetermined length along the circumferential direction of the container support 11b. The inner space 119 may be defined as a space located inside the second inner wall 117c.

The first and second inner walls 117b and 117c may be formed in an arc shape along a circumferential direction of the container support 11b. The first and second inner walls 117b and 117c may be formed to be parallel to an inner surface of the container support 11b. The bottom edge of the bottom plate 12 may cover the mounting space and the upper surface of the sidewall 118.

The mounting space formed between the first and second inner walls 117b and 117c and the upper surface of the sidewall 118 may be configured such that electronic devices or sensors (e.g., the proximity sensor 86, the gyro sensor 88, and the water level sensor 87) installed in the mounting space do not contact the heat dissipating plate 84. Heights of the first and second inner walls 117b and 117c may be less than a height of the outer circumferential surface 116 of the container support 11b. Top ends of the first and second inner walls 117b and 117c may be provided below the upper end of the container support 11b, and bottom ends of the first and second inner walls 117b and 117b may be provided above the lower end of the container support 11b. The upper surface of the sidewall 118 may be recessed to be located below the upper end of the container support 11b and a lower surface of the sidewall 118 may be positioned above the lower end of the container support 11b.

In the container support 11b, a thermoelectric element 81 to cool or heat the bottom plate 12 of the container 10a may be provided. The thermoelectric element 81 may be a Peltier device or a thermoelectric cooler (TEC). The inner space 119 may be defined as a space between the thermoelectric element 81 and the base plate 18. The bottom plate 12 may be provided on a top surface of the thermoelectric element 81. A lower surface of an edge of the bottom plate 12 may be provided on the top ends of the first and second inner walls 117c and 117b.

A warning light 91 may be provided on a lower side of the container support 11b. The warning light 91 may be emitted according to a water level in the water tank 10 sensed by the water level sensor 86. The controller C may turn on the water light 91 when the water level detected by the water level sensor 86 is lower than a predetermined value to inform the user of a lack of water or to refill the water tank 10.

The warning light 91 may be installed on a lower surface of the mounting portion 117 above the base plate 18 to be exposed to an outside. The warning light 91 may be a ring-shaped light emitting diode. A warning light installation groove 117a (FIG. 12) into which the warning light 91 is inserted may be formed on the outer circumferential surface 116 and extend into a lower surface of the mounting portion 117 to be below the bottom surface of the sidewall 118 and below the bottom end of the inner wall 117c. The warning light installation groove 117a may therefore be formed in a ring shape.

A diffusion plate 93 may be provided on a lower surface of the inner wall 117. The diffusion plate 93 may diffuse light irradiated from the warning light 91. The diffusion plate 93 may be formed in a ring shape. The diffusion plate 93 may be inserted into the warning light installation groove 117a. The warning light 91 may be inserted into an inner space of the diffuser plate 93 so that an outer circumferential surface of the warning light 91 may contact an inner circumferential surface of the diffuser plate 93.

The thermoelectric element 81 may cover an opened upper side of the inner space 119. The base plate 18 may cover an opened lower side of the inner space 119. The thermoelectric element 81 may be provided between the bottom plate 12 and the base plate 18. The thermoelectric element 81 may cool the bottom plate 12 and cool the water stored in the water tank 10.

The thermoelectric element 81 may be provided below the bottom plate 12 and maintain a temperature of water stored in the water tank 10 at a predetermined temperature. A heat diffusing plate 84 may be provided in the inner space 119 of the container support 11b. Also, a heat radiation fan 83 may be provided in the inner space 119 of the container support 11b. A motor 82 to rotate the fan 83 may be installed between the bottom plate 12 and the base plate 18.

A plurality of radiating fins 845 may protrude upward from an outer edge of the heat diffusing plate 84. A lower edge of the thermoelectric element 81 may be brought into contact with an upper surface of the plurality of radiating fins 845 so that heat generated in the thermoelectric elements 81 may be exchanged with surrounding air of the plurality of radiating fins 845. The radiating fins 845 and the heat diffusing plate 84 may serve as a heat sink.

As an alternative, the plurality of radiating fins 845 may protrude downward from the outer edge of the heat diffusing plate 84. In such an alternative embodiment, the thermoelectric element 81 may be placed on the heat diffusing plate 84, and the fan 83 may be provided below the heat sink 84 to be surrounded by the radiating fins 845.

The plurality of radiating fins 845 may be provided along a circumferential direction of the heat diffusing plate 84, which may be formed in a circular shape. Accordingly, the plurality of radiating fins 845 may be arranged in the circumferential direction of the heat diffusing plate 84 so that the overall shapes of the radiating fins 845 and heat diffusing plate 84 may be annular.

The fan 83 may be provided inside the plurality of radiating fins 845 on an upper surface of the heat diffusing plate 84. The fan 83 may suction air in the direction of a rotation axis of the motor 82 and then discharge the air in a direction perpendicular to the rotation axis. A rotation shaft of the motor 82 may be arranged vertically, so the fan 83 may suck the air flowing through the ventilation hole 181 of the base plate 18 from a lower direction, and discharge the air toward the plurality of radiating fins 845. The heat diffusing plate 84 may be provided with a hole to guide the air passing through the ventilation holes 181 to the fan 83 at a portion corresponding to the ventilation holes 181 of the base plate 18. Air to cool the thermoelectric element 81 may be suctioned through the ventilation holes 181 and the hole of the heat diffusing plate 84, while hot air may be exhausted through the heat radiating fins 845 and out through an outermost portion or edge of the ventilation holes 181.

An insertion hole or opening 846 extending vertically may be formed in the center of the heat diffusing plate 84. The step portion or insertion protrusion 186 formed at the center of the base plate 18 may be inserted into the insertion hole 846. The base plate 18 may thus be coupled to the heat diffusing plate 84. A hook may be formed in the step portion 186 to allow the base plate 18 to be firmly coupled to the heat diffusing plate 84. The hook may be hooked on the upper surface of the heat diffusing plate 84 when the step portion 186 is inserted into the insertion hole 846.

The thermoelectric element 81 may be provided with a hollow portion or motor opening 811 in which the motor 82 is installed. The motor opening 811 may be formed at a central portion of the thermoelectric element 81. The fan 83 may be provided below the motor 82.

A water temperature sensor 85 (e.g., thermometer) may further be provided between the bottom plate 12 and the base plate 18. The water temperature sensor 85 may sense a temperature of the water stored in the water tank 10. The water temperature sensor 85 may be installed in a space inside the protrusion 121 of the bottom plate 12 of the water tank 10. The bottom plate 12 may be made of a material having a high thermal conductivity or metal (e.g., stainless steel). Alternatively, the water temperature sensor 85 may partially protrude above the bottom plate 12 into the container of the water tank 10 to accurately measure a temperature of the water.

When the temperature of the water in the water tank 10 sensed by the water temperature sensor 85 is not within a predetermined temperature range, the thermoelectric element 81 may be activated to cool the water, and the heat of the thermoelectric element 81 may flow through the heat diffusing plate 84 to be dissipated. Alternatively, when the water temperature is below the predetermined temperature range, the thermoelectric element 81 may be activated to heat the water.

When a temperature of the thermoelectric element 81 is higher than a reference or predetermined temperature, or when a temperature of the heat diffusing plate 84 is higher than a reference or predetermined temperature, the motor 82 may be operated and the fan 83 may be rotated. When the fan 83 is rotated, outside air may flow through the ventilation holes 181 formed in the base plate 18 and pass through the heat diffusing plate 84, and then may be discharged to the outside through the ventilation holes 181 formed in the base plate 18. The heat diffusing plate 84 and the thermoelectric element 81 may therefore be cooled. Alternatively or in addition thereto, there may be vents formed on a lower outer surface or corner of the container support 11b through which hot air may be exhausted.

The water temperature sensor 85 may be installed in the protrusion 121 of the bottom plate 12, which has a relatively large area in contact with the water stored in the water tank 10 and also with water about to flow into the pump 20. Therefore, the water temperature sensor 85 may accurately detect the temperature of the water stored in the water tank 10.

A water level sensor 86 may be further provided between the bottom plate 12 and the base plate 18. The water level sensor 86 may be installed in the mounting space formed in the mounting portion. The warning light 91 may emit light according to a detection value of the water level sensor 96.

The water level sensor 86 may be installed in the mounting space of the mounting portion 117. Further, a proximity sensor 87 to sense a pet may be provided between the bottom plate 12 and the base plate 18 and installed inside the inner space 119. A signal (e.g., laser) of the proximity sensor 87 may be transmitted through a signal transmission membrane covering a hole 11H formed on the outer circumferential surface 116 and the first inner wall 117b of the container support 11b.

When the proximity sensor 87 senses a pet, the controller C may operate the pump 20. There may be a plurality of proximity sensors 87. The pumping capacity of the pump 20 may be adjusted according to detection values of the plurality of proximity sensors 87. For example, when the plurality of proximity sensors 87 sense a pet within a predetermined distance range, respectively, the controller C may determine that a plurality of pets have approached the water dispenser, and the pumping capacity or rate of the pump 20 may be increased. The warning light 91 may be emitted according to a detection value of the proximity sensor 87.

A gyro sensor 88 to sense an inclination of the water tank 10 may be provided between the bottom plate 12 and the base plate 18 inside the mounting space between the first and second inner walls 117b and 117c. A plurality of gyro sensors 88 may be provided to sense an inclination of each of the gyro sensors 88. The controller C may calculate a final inclination of the water tank 10 based on the sensed inclinations of the plurality of gyro sensors.

A pedestal may also be provided on a lower side of the water tank 10 to adjust a height. The controller C may correct a tilting or inclination of the water tank 10 by adjusting a height of the base leg 183 and/or the pedestal when the inclination of the water tank 10 detected by the gyro sensor 88 is determined to be a predetermined inclination value or more.

Figure 13:
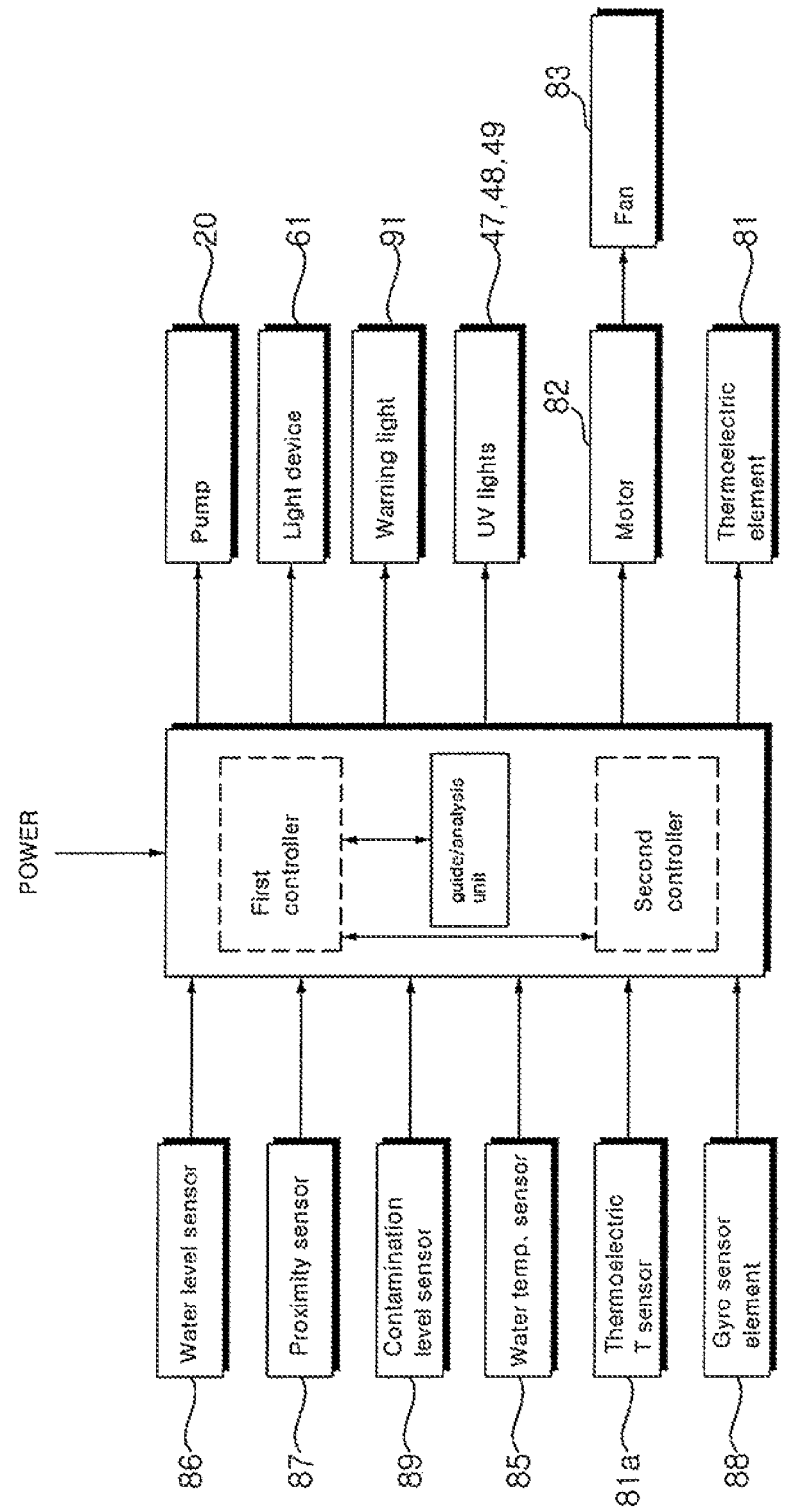
FIG. 13 is a control block diagram of a pet water dispenser according to an embodiment.

Referring to FIG. 13, the controller C may receive a signal from the water level sensor 86 and calculate a water level value. When the calculated water level value is lower than a predetermined water level value, the controller C may operate the warning light 91.

The controller C may receive a signal from the proximity sensor 87 to determine whether a pet has approached the pet water dispenser within a predetermined distance range. If it is determined that the pet has approached the pet water dispenser within the predetermined distance range, the controller C may activate the pump 20 to perform water supply and stop an operation of the pump 20 when it is determined that a pet is no longer within the predetermined distance range. The proximity sensor 87 may continuously sense a position of the pet, and the controller C may operate the pump 20 only when the pet continues to approach the pet water dispenser by a predetermined increment or more within the predetermined distance range. When the controller C receives multiple signals from the proximity sensors 87 and determines that a plurality of pets are approaching, the controller C may increase the pumping capacity of the pump 20 to correspond to the number of approaching pets so that the pet water dispenser can provide sufficient amount of water.

The controller C may continuously store an operation time of the pump 20 according to a signal from the proximity sensor 87 and analyze the operation times. The controller C may periodically judge or determine the time and water supply period of water periodically consumed by the pet, and the controller C may further predict when a pet will consume water and operate the pump 20 so that a water supply amount is provided at a predicted water supply time.

When the controller C receives a signal from the contamination level sensor 89 provided in the water tank 10 and determines that a degree of contamination of the water stored in the water tank 10 is equal to or higher than a first predetermined contamination value, the controller C may turn on the first, second, and third UV filters 47, 48, and 49. When it is determined that the degree of contamination exceeds another second predetermined contamination value, the operation of the pump 20 may be stopped and the controller C may operate the warning light 91 and/or a control a speaker to sound a warning alarm. The contamination level sensor 89 may be provided inside the container 10a, or may be provided in the container support 11b or in the inner assembly 100 and have a portion that protrudes into the container 10a to accurately measure a contamination level of the water.

The controller C may receive a water temperature signal from the water temperature sensor 85 and activate the thermoelectric element 81 to cool the water when the temperature detected by the water temperature sensor 85 is equal to or higher than a first predetermined temperature value. When the temperature detected by the water temperature sensor 85 is lower than a second predetermined temperature value, the controller C may activate the thermoelectric element 81 to heat the water temperature sensor 85.

The controller C may receive a signal from a thermoelectric-element temperature sensor 81a to sense a temperature of the thermoelectric element 81 and/or heat dissipation plate 84. When the temperature of the thermoelectric element 81 is determined to be a predetermined temperature value or more, the thermoelectric element 81 and the heat diffusing plate 84 may be cooled by operating the motor 82 so that the fan 83 is rotated.

The controller C may adjust the height of a pedestal and/or a base leg 183 provided below the water tank 10 when an inclination of the water tank 10 is determined to be a predetermined inclination value or more based on a signal received from the gyro sensor 88. The controller C may therefore prevent the water tank 10 from being overturned and spilling.

When the proximity sensor 87 detects the pet, the controller C may emit light of at least one of the lights 61 (light device) and 91 (warning light). The pet may be comforted or attracted by light emitted from at least one of the lights 61 and 91, and may therefore be encouraged to drink water provided from the pet water dispenser. In addition, the controller C may emit at least one of the lights 61 and 91 if an amount of power charged in the battery B is equal to or less than a predetermined charge value.

The warning light 91 may emit light of various colors in various pulses to inform the user of various information. For example, when an amount of power of the battery B is insufficient, the warning light 91 may emit red light. When the amount of water stored in the water tank 10 is insufficient, the light 91 may emit blue light. When the pet approaches the pet water dispenser, the light 91 may emit yellow light or light resembling daylight. As another example, when the amount of power of the battery B is insufficient, the light 91 may blink or pulse red light. When the amount of water stored in the water tank 10 is insufficient, the light 91 may continuously emit red light.

The controller C may include a first controller to control the pump 20 and the UV filters 47, 48, and 49. In addition to the first controller, a second controller may be provided to control the motor 82, the leg base plate 183, the pedestal, and/or the warning light 91. In addition, a guide and analysis unit or memory to store and analyze signals of the sensors 85-89 may be included. The first controller and the second controller may use data of the guide/analysis unit.

As described above, since the pet water dispenser may include the thermoelectric element 81 to cool the water stored in the water tank 10, the temperature of the water stored in the water tank 10 may be easily maintained. Since the pet water dispenser may include the water temperature sensor 85 to sense the temperature of water stored in the water tank 10, the thermoelectric device 81 may be operated in accordance with the temperature of the water sensed by the water temperature sensor 85 so that the water stored in the water tank 10 may be cooled and maintained.

Since the pet water dispenser may include the water level sensor 86 to measure the weight of the water applied to the bottom plate 12, when the water level sensed by the water level sensor 86 is lower than a predetermined water level, the warning light 91 may be turned on so that the user may replenish the water, Since the pet water dispenser may include the proximity sensor 87 to sense the pet, the pump 20 may be operated only when the proximity sensor 87 senses the pet and the pumping capacity of the pump 20 may be adjusted according to the number pets detected by the proximity sensors 87. Since the pet water dispenser may include the gyro sensor 88 that senses an inclination of the water tank 10, it may be possible to prevent the water tank 10 from tilting by adjusting the height of the base leg 183 and/or a pedestal provided on a lower side of the water tank 10.

This application is related to U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920 filed on May 24, 2019; and 10-2019-0080603 and 10-2019-0080604 filed on Jul. 4, 2019.

Embodiments disclosed herein may be implemented as a liquid dispenser that supplies drinking water to an animal such as a pet. However, embodiments disclosed herein are not limited to pets. For example, the liquid dispenser may be used in a zoo to supply drinking water to animals kept in a zoo, research areas, wildlife preservation areas, etc.

Embodiments disclosed herein may be implemented as a pet water dispenser capable of providing fresh water to a pet, controlling a temperature of water according to the species of pet, and accurately detecting a water level even when used for a long time. The problems solved by the present disclosure are not limited to the above-mentioned problems, and other problems not mentioned can be clearly understood by those skilled in the art from the following description.

A pet water dispenser according to an embodiment may include a water tank or tank having an opened upper side and an inner assembly covering the opened upper side of the water tank. The inner assembly may pressurize the water contained in the water tank to the upper surface of the inner assembly to provide the water to the pet.

An upper portion of the inner assembly may protrude upward from the water tank, and a lower portion of the inner assembly may be inserted into the water tank. An upper surface of the inner assembly may be protruded upward, and a pump for feeding water in the water tank to the upper surface may be provided below the inner assembly.

The water tank may be composed of a container and a container support. The container may be opened on the upper side. Water may be stored inside the container. The container support may be provided below the container.

The pump may be provided in the container, or alternatively in the container support. The water discharged from the pump can be transferred along a water supply pipe or pipe and the water transferred along the water supply pipe may be supplied to the upper surface of the water supply plate and flow along the upper surface of the water supply plate.

A water temperature control unit or thermoelectric element to cool or heat the water stored in the container may be provided in the container support. The water temperature control unit may be a thermoelectric element to cool the bottom plate of the container.

A projection formed at a central portion of a bottom plate of the container may be formed to be convex in the shape of a cylinder toward an upper side. A water temperature sensor to sense the temperature of the water stored in the container may be provided inside the protrusion. The thermoelectric element can cool the bottom plate when the temperature of water sensed by the water temperature sensor is higher than a set value.

The container support may be provided below the bottom plate, and a plurality of heat-radiating fins may be provided along a circumferential direction at a top edge of a heat sink or radiating plate provided inside the container support. A bottom edge of the thermoelectric element may be in contact with an upper surface of the plurality of radiating fins.

A heat radiating fan provided inside the plurality of radiating fins in the upper surface of the heat sink may be rotated by a motor. The thermoelectric element may be formed with a hollow portion or space in which the motor is installed.

A base provided below the container support may separate the container support from the bottom of the container. Vent holes or ventilation holes may be formed in the base. A base leg protruding from the lower side of the base may separate the base from the floor where the container support is placed.

An insertion protrusion or step portion formed at a central portion of the base may be inserted into an insertion hole or opening formed vertically through the center of the heat sink, and the insertion protrusion may be coupled to the heat sink.

A mounting portion or inner wall protruding from an inner surface of the container support may be formed to have a predetermined length along a circumferential direction of the container support. The container support may be provided with an inner or interior space located on an inner side of the mounting portion. The thermoelectric element may cover an upper side of the inner space, and the base may cover a lower side of the inner space. The heat sink may be provided in the inner space between the thermoelectric element and the base. The mounting portion may also be referred to as an installation part.

Illumination or a warning light may be installed on the lower surface of the mounting portion. The warning light may be inserted into an illumination installation groove or a warning light installation groove formed in the lower surface of the mounting portion. The warning light installation groove may extend from an inner circumferential surface of the mounting portion toward an outer circumferential surface of the mounting portion. A warning light and warning light installation groove may be formed in a ring shape.

The mounting portion may include a first mounting portion and a second mounting portion spaced apart from each other in the circumferential direction of the container support. The first mounting portion and the second mounting portion may be formed in an arc shape along the circumferential direction of the container support. The bottom edge of the bottom plate may cover a groove formed between the first and second mounting portions. A water level sensor installed in the recessed groove may sense a weight of the water stored in the container. The warning light may be emitted when the weight of the water sensed by the water level sensor is lower than a set value. The upper surface of the mounting portion may be opened. The bottom edge of the bottom plate may cover the opened upper surface of the mounting portion.

A proximity sensor installed in the mounting portion may sense the pet within a predetermined distance range. The warning light may be emitted when the proximity sensor detects the pet. The warning light may be emitted when an amount of power charged in auxiliary battery or battery that supplies power to the pump is less than a set value. The water level sensor may be installed in the container support. The warning light may be installed in the container support. The warning light may be emitted according to the detection value of the water level sensor.

The proximity sensor may be installed in the container support. The pump may be operated according to a detection value of the proximity sensor. The proximity sensor may be provided with a plurality of proximity sensors. The pumping capacity of the pump may be adjusted according to the sensing values of the plurality of proximity sensors. The warning light may be installed in the container support. The warning light may be emitted according to the detection value of the proximity sensor.

The thermoelectric element may cool the bottom plate that forms the space in which the water is stored together with a wall. The temperature of the water stored in the water tank may be cooled even during a high temperature season, and fresh water may be provided to the pet. The temperature of the water stored in the water tank may be adjusted by using the thermoelectric element according to a species of the pet. Water stored in the water tank may therefore be adjusted to a temperature that the pet may prefer to drink. The water level sensor may measure the weight of the water applied to the bottom plate. The water level may therefore be accurately detected even when the water level sensor is used for a long time.

Embodiments disclosed herein may be implemented as a liquid dispenser, comprising a tank to store liquid and having a bottom, a base provided below the bottom of the tank, a pump provided in the tank, a plate provided above the tank and having an upper surface on which liquid from the tank may be dispensed, a pipe through which liquid discharged from the pump may be transferred to the plate, and a thermoelectric element provided in the base to cool liquid in the tank.

A protrusion may be formed at a center of the bottom of the tank. A temperature sensor may be provided inside the protrusion to sense a temperature of liquid in the tank. The thermoelectric element may cool the liquid in the tank when the temperature of the liquid sensed by the temperature sensor is greater than or equal to a predetermined temperature.

A heat sink may be provided in the base and have a plurality of heat radiating fins. A lower edge of the thermoelectric element may be in contact with an upper surface of the plurality of radiating fins.

A fan may be surrounded by the plurality of radiating fins. A motor to rotate the fan may be provided within an opening formed at a center of the thermoelectric element.

A vent may be formed in the base. A base leg may protrude from a bottom surface of the base to space the base apart from the ground surface. The vent may be formed in the bottom surface of the base.

An insertion hole may be formed at a center of the heat sink. An insertion protrusion may be formed at a center of a base plate of the base that may be inserted into the insertion hole to couple the base to the heat sink.

An inner wall may be spaced apart from an inner surface of the base. An inner space may be located on an inner side of the inner wall. The thermoelectric element may cover a top of the inner space, a base plate may cover a bottom of the inner space, and the heat sink may be provided in the inner space between the thermoelectric element and the base plate.

A warning light may be provided on lower surfaces of the inner wall and the base. A groove may be formed in the lower surface of the inner wall into which the warning light may be inserted. The groove extends from an inner circumferential surface of the inner wall toward an outer circumferential surface of the base. The warning light may be formed in a ring shape.

A first mounting portion may be formed on an inner circumferential surface of the base and a second mounting portion may be formed on an outer circumferential surface of the inner wall to be spaced from the first mounting portion. The first mounting portion and the second mounting portion may be formed in an arc shape, A recess may be formed between the first mounting portion and the second mounting portion. An edge of the bottom of the tank may cover the recess. A level sensor may be provided in the recess to sense a weight of liquid stored in the tank. The warning light may be emitted when the weight of liquid sensed by the level sensor is less than a predetermined liquid level value.

An edge of the bottom of the tank may cover an opening between the base and the inner wall. A level sensor to sense a weight of liquid applied to the bottom of the tank may be provided in the opening. The warning light may be emitted when a weight of liquid sensed by the level sensor is below a predetermined weight value.

A proximity sensor may be provided in the base to sense a pet within a predetermined distance range. The warning light may be emitted when the proximity sensor detects a pet.

A battery may supply power to the pump. The warning light may be emitted when an amount of power charged in the battery is less than a predetermined charge value.

Embodiments disclosed herein may be implemented as a liquid dispenser, comprising a tank, a pump configured to pump liquid in the tank, a pipe connected to the pump, a plate provided above the tank and connected to the pipe to dispense liquid pumped from the pump via an outlet, a base provided below a bottom of the tank, a level sensor installed in the base to sense a level of liquid stored in the tank, and a light emitting device installed in the base. The light emitting device may be emitted according to a detection value of the level sensor.

Embodiments disclosed herein may be implemented as a liquid dispenser, including a tank, a pump configured to pump the liquid, a plate provided above the tank having an outlet, a pipe connected to the pump and the plate to transfer liquid from the pump to the outlet of the plate to dispense the liquid, a base provided below the tank, and a proximity sensor provided in the base to sense a pet within a predetermined distance range. The pump may be operated according to a detection value of the proximity sensor. The proximity sensor may be provided with a plurality of proximity sensors, and a pumping capacity of the pump may be adjusted according to detection values of the plurality of proximity sensors.

Embodiments disclosed herein may be implemented as a liquid dispenser including a tank, a pump configured to pump liquid in the tank, a plate provided above the tank and having an outlet for dispensing liquid, a pipe extending between the pump and the outlet of the plate to guide liquid pumped by the pump to an upper surface of the plate, a base provided below the tank and separated from the liquid stored in the tank, a proximity sensor installed in the base to sense a pet within a predetermined distance range, and a light emitting device provided in the base that emits light according to a detection value of the proximity sensor.

The effects of the present disclosure are not limited to the effects mentioned above, and other effects not mentioned can be clearly understood by those skilled in the art from the description of the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
   a tank to store liquid and having a bottom;
   a base provided below the bottom of the tank;
   a pump provided in the tank;
   a plate provided above the tank and having an upper surface on which liquid from the tank is dispensed;
   a pipe through which liquid discharged from the pump is transferred to the plate;
   a thermoelectric element provided in the base to cool liquid in the tank;
   a heat sink provided in the base and having a plurality of heat radiating fins; and
   a fan surrounded by the plurality of radiating fins.

2. The liquid dispenser of claim 1, further including:
a protrusion formed at a center of the bottom of the tank; and,
a temperature sensor provided inside the protrusion to sense a temperature of liquid in the tank, wherein the thermoelectric element cools the liquid in the tank when the temperature of the liquid sensed by the temperature sensor is greater than or equal to a predetermined temperature.

3. The liquid dispenser of claim 1, wherein a lower edge of the thermoelectric element is in contact with an upper surface of the plurality of radiating fins.

4. The liquid dispenser of claim 1, further including:
a motor to rotate the fan and provided within an opening formed at a center of the thermoelectric element.

5. The liquid dispenser of claim 1, further including a vent formed in the base.

6. The liquid dispenser of claim 5, further including a base leg protruding from a bottom surface of the base to space the base apart from the ground surface, wherein the vent is formed in the bottom surface of the base.

7. The liquid dispenser of claim 5, further including:
an insertion hole formed at a center of the heat sink; and
an insertion protrusion formed at a center of a base plate of the base that is inserted into the insertion hole to couple the base to the heat sink.

8. The liquid dispenser of claim 5, further including:
an inner wall spaced apart from an inner surface of the base; and
an inner space located on an inner side of the inner wall, wherein the thermoelectric element covers a top of the inner space, a base plate covers a bottom of the inner space, and the heat sink is provided in the inner space between the thermoelectric element and the base plate.

9. The liquid dispenser of claim 8, wherein a warning light is provided on lower surfaces of the inner wall and the base.

10. The liquid dispenser of claim 9, further including a groove formed in the lower surface of the inner wall into which the warning light is inserted.

11. The liquid dispenser of claim 10, wherein the groove extends from an inner circumferential surface of the inner wall toward an outer circumferential surface of the base.

12. The liquid dispenser of claim 9, wherein the warning light is formed in a ring shape.

13. The liquid dispenser of claim 9, further including
a first mounting portion formed on an inner circumferential surface of the base and a second mounting portion formed on an outer circumferential surface of the inner wall to be spaced from the first mounting portion, wherein the first mounting portion and the second mounting portion are formed in an arc shape;
a recess formed between the first mounting portion and the second mounting portion, wherein an edge of the bottom of the tank covers the recess; and
a level sensor provided in the recess to sense a weight of liquid stored in the tank, wherein the warning light is emitted when the weight of liquid sensed by the level sensor is less than a predetermined liquid level value.

14. The liquid dispenser of claim 9, wherein an edge of the bottom of the tank covers an opening between the base and the inner wall, wherein a level sensor to sense a weight of liquid applied to the bottom of the tank is provided in the opening, and wherein the warning light is emitted when a weight of liquid sensed by the level sensor is below a predetermined weight value.

15. The liquid dispenser of claim 9, further comprising a proximity sensor provided in the base to sense a pet within a predetermined distance range, wherein the warning light is emitted when the proximity sensor detects a pet.

16. The liquid dispenser of claim 9, further including a battery to supply power to the pump, wherein the warning light is emitted when an amount of power charged in the battery is less than a predetermined charge value.

17. A liquid dispenser, comprising:
a tank;
a pump configured to pump liquid in the tank;
a pipe connected to the pump;
a plate provided above the tank and connected to the pipe to dispense liquid pumped from the pump via an outlet;
a base provided below a bottom of the tank;
a thermoelectric element provided in the base to cool liquid in the tank;
a motor configured to rotate a fan, wherein the thermoelectric element is provided around the motor;
a level sensor installed in the base to sense a level of liquid stored in the tank; and
a light emitting device installed in the base, wherein the light emitting device is emitted according to a detection value of the level sensor.

18. A liquid dispenser, including:
a tank;
a pump configured to pump the liquid;
a plate provided above the tank having an outlet;
a pipe connected to the pump and the plate to transfer liquid from the pump to the outlet of the plate to dispense the liquid;
a base provided below the tank; and
a plurality of proximity sensors provided in the base to sense a pet within a predetermined distance range, wherein the pump is operated according to a detection value of the plurality of proximity sensors, and a pumping capacity of the pump is adjusted according to detection values of the plurality of proximity sensors.

19. A liquid dispenser, including:
a tank;
a pump configured to pump liquid in the tank;
a plate provided above the tank and having an outlet for dispensing liquid;
a pipe extending between the pump and the outlet of the plate to guide liquid pumped by the pump to an upper surface of the plate;
a base provided below the tank and separated from the liquid stored in the tank;
a proximity sensor installed in the base to sense a pet within a predetermined distance range; and
a light emitting device provided in the base that emits light according to a detection value of the proximity sensor.

* * * * *